United States Patent [19]
Hirai et al.

[11] Patent Number: 6,122,021
[45] Date of Patent: *Sep. 19, 2000

[54] LIQUID CRYSTAL DISPLAY ELEMENT AND A PROJECTION TYPE LIQUID CRYSTAL DISPLAY APPARATUS

[75] Inventors: Yoshinori Hirai; Satoshi Niiyama; Tomoki Gunjima, all of Yokohama; Masanori Yuki, Hatano; Masaya Kunigita, Yokohama; Yukio Yoshikawa, Kawasaki; Eiji Shidoji, Yokohama, all of Japan

[73] Assignee: Asahi Glass Company, Ltd., Tokyo, Japan

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/350,175

[22] Filed: Nov. 30, 1994

Related U.S. Application Data

[63] Continuation-in-part of application No. 08/108,009, Aug. 18, 1993, Pat. No. 5,379,137, which is a continuation of application No. 07/998,029, Dec. 29, 1992, abandoned, which is a continuation of application No. 07/858,025, Mar. 26, 1992, Pat. No. 5,196,952, which is a continuation-in-part of application No. 07/886,946, May 22, 1992, Pat. No. 5,386,306, which is a continuation of application No. 07/413,072, Sep. 27, 1989, Pat. No. 5,150,232.

[30] Foreign Application Priority Data

| Oct. 4, 1988 | [JP] | Japan | 63-249020 |
| Jul. 27, 1989 | [JP] | Japan | 1-192760 |
| Mar. 27, 1991 | [JP] | Japan | 3-87541 |

[51] Int. Cl.$^7$ .......................... G02F 1/1333; G02F 1/1335

[52] U.S. Cl. ................... 349/10; 349/86; 349/89

[58] Field of Search .............. 359/51, 52, 102; 349/86, 89, 93, 10

[56] References Cited

U.S. PATENT DOCUMENTS

| 4,050,786 | 9/1977 | Feldman | 349/155 |
| 4,411,495 | 10/1983 | Beni et al. | 349/91 |
| 4,818,070 | 4/1989 | Gunjima et al. | 359/93 |

(List continued on next page.)

FOREIGN PATENT DOCUMENTS

| 0 198 168 | 10/1986 | European Pat. Off. |
| 480415 | 4/1992 | European Pat. Off. |
| 61-196229 | 8/1986 | Japan. |

(List continued on next page.)

OTHER PUBLICATIONS

Molecular Crystals and Liquid Crystals, (Inc. Nonlinear Optics), vol. 149, Aug. 1987, pp. 163–176.
Journal of Applied Physics, vol. 60, No. 6, Sep. 1986, New York, pp. 2142–2148.
SID International Symposium 1988, May 1988, pp. 227–230.

(List continued on next page.)

*Primary Examiner*—Anita Pellman Gross
*Attorney, Agent, or Firm*—Oblon, Spivak, McClelland, Maier & Neustadt, P.C.

[57] ABSTRACT

A liquid crystal display element comprises a pair of substrates provided with electrodes and a liquid crystal and solidified matrix composite material, disposed between the pair of substrates, which includes a nematic liquid crystal dispersed and held in a solidified matrix, the nematic liquid crystal being such that the refractive index of the liquid crystal is changed depending on states of applying a voltage wherein in a state, the refractive index of the liquid crystal substantially coincides with that of the solidified matrix to thereby pass light, and in the other state, the former does not coincide with the latter to thereby cause the scattering of light, wherein the refractive index anisotropy $\Delta n$ of the liquid crystal used is 0.18 or higher, and the dielectric anisotropy $\Delta \epsilon_{LC}$ of the liquid crystal used satisfies the relation of $5 < \Delta \epsilon_{LC} < 13$.

38 Claims, 3 Drawing Sheets

U.S. PATENT DOCUMENTS

| | | | |
|---|---|---|---|
| 5,040,877 | 8/1991 | Blinc et al. | 359/63 |
| 5,150,232 | 9/1992 | Gunjima et al. | 359/51 |
| 5,153,702 | 10/1992 | Aoyama et | 359/59 |
| 5,170,271 | 12/1992 | Lackner et al. | 349/25 |
| 5,196,952 | 3/1993 | Hirai et al. | 359/51 |
| 5,206,747 | 4/1993 | Wiley et al. | |
| 5,235,445 | 8/1993 | Hirai et al. | 359/51 |
| 5,268,783 | 12/1993 | Yoshinaga et al. | 349/88 |
| 5,305,126 | 4/1994 | Kobayashi et al. | 359/52 |
| 5,331,446 | 7/1994 | Hirai et al. | 359/51 |
| 5,379,137 | 1/1995 | Hirai et al. | 359/51 |
| 5,386,306 | 1/1995 | Gunjima et al. | 359/52 |
| 5,450,220 | 9/1995 | Onishi et al. | 359/51 |

FOREIGN PATENT DOCUMENTS

| | | |
|---|---|---|
| 61-502286 | 10/1986 | Japan . |
| 62-28712 | 2/1987 | Japan . |
| 63-137211 | 6/1988 | Japan . |
| 63-501512 | 6/1988 | Japan . |
| 3-126915 | 5/1991 | Japan . |
| 3-282425 | 12/1991 | Japan . |
| 3-505932 | 12/1991 | Japan . |
| 4-188105 | 7/1992 | Japan . |
| 4-263217 | 9/1992 | Japan . |
| 4-296719 | 10/1992 | Japan . |
| 4-318514 | 11/1992 | Japan . |
| 5-93905 | 4/1993 | Japan . |
| WO 90/03593 | 4/1990 | WIPO . |

OTHER PUBLICATIONS

Fujisawa et al, "Light Scattering Mechanism and Electro–Optical Properties of Polymer Network Liquid Crystal Dispaly", The Institute of Television Engineers of Japan Technical Report, Information Display (Feb., 1990), pp. 1–8.

Merck Korea PDLC Seminar, Oct. 26, 1992, D. Coates, et al., "Recent Developments in Liquid Crystal and Polymer Systems for PDLC Applications".

Molecular Crystals and Liquid Crystals, (Inc. Nonlinear Optics), vol. 165, Dec. 1988, pp. 511–532.

Appl. Phys. Lett. vol. 39, No. 3, pp. 195–197, Aug. 1, 1981, G. Beni, et al., "Anisotropic Suspension Display".

Appl. Phys. Lett. vol. 40, No. 1, pp. 22–24, Jan. 1, 1982, H.G. Craighead et al., "New Display Based on Electrically Induced Index Matching in an Inhomogeneous Medium".

LIQUID CRYSTAL DISPLAY ELEMENT AND A PROJECTION TYPE LIQUID CRYSTAL DISPLAY APPARATUS

This application is a Continuation-in-Part application of U.S. Ser. No. 08/108,009 filed on Aug. 18, 1993, now U.S. Pat. No. 5,379,137, which is a Continuation Application of U.S. Ser. No. 07/998,029 filed on Dec. 29, 1992, now abandoned, which is a Continuation Application of U.S. Ser. No. 07/858,025 filed on Mar. 26, 1992, now U.S. Pat. No. 5,196,952. The entire contents of U.S. Pat. No. 5,196,952 are hereby incorporated by reference.

This application is also a Continuation-in-Part application of U.S. Ser. No. 07/886,946 filed on May 22, 1992, now U.S. Pat. No. 5,386,306, which is a Continuation Application of U.S. Ser. No. 07/413,072 filed on Sep. 27, 1989, now U.S. Pat. No. 5,150,232. The entire contents of U.S. Pat. No. 5,150,232 are hereby incorporated by reference.

BACKGROUND OF THE INVENTION

1. Field of the Invention

The present invention relates to a liquid crystal display element including a nematic liquid crystal dispersed and held in a solidified matrix, especially, a liquid crystal display element having an active element for each picture element electrode and a projection type liquid crystal display apparatus using such display element.

In recent years, liquid crystal displays have been widely used for personal word processors, hand-held computers portable TV sets and so on, taking the advantages of low power consumption, low driving voltage and so on. Of the liquid crystal displays, liquid crystal display elements having an active element for each picture element electrode have particularly been noted and developed.

As such liquid crystal display elements, there was a proposal on liquid crystal display elements in which a dynamic scattering mode (DSM) liquid crystal is used. However, the liquid crystal display element of this type had a disadvantage of large current consumption because a high value of electric current passed in the DSM liquid crystal. Now, liquid crystal display elements in which a twist nematic (TN) type liquid crystal is used have been widely used. For instance, portable TVs have been widely commercialized. Since the TN type liquid crystal display element has a very small leak current and a small power consumption, it is suitable for using a battery as a power source.

When the liquid crystal display element using active elements is used for DS mode, the leak current of the liquid crystal itself is large. Accordingly, it was necessary to provide a large storage capacitance in parallel to each picture element, and the power consumption of the liquid crystal display element itself is large.

In the TN mode, since a leak current in the liquid crystal itself is very small, it is unnecessary to provide a large storage capacitance and the power consumption of the liquid crystal display element itself can be small.

In the TN mode liquid crystal, however, there is a problem that the transmittance of light is small because two polarization plates are required. In particular, when a color filter is used for obtaining a colored display, only several percents of incident light can be utilized. It is, therefore, necessary to use a strong light source, as a result of increasing power consumption.

Further, the TN mode liquid crystal display element has disadvantages of requiring a very strong light source for projecting a picture image on a projection screen, difficulty in obtaining a high contrast on the projection screen, difficulty in obtaining a high contrast on the projection screen, and adverse effect to the liquid crystal display element due to heat from the light source.

In order to solve the problems in the TN mode liquid crystal display element, there is proposed such mode that a liquid crystal polymer composite material in which a nematic liquid crystal is dispersed and held in a polymer matrix is used, and a low voltage such as 10 V or lower is sufficient to drive it by utilizing the scattering-transparent characteristics.

However, in the conventional liquid crystal and polymer composite material, there was hysteresis in the voltage-transmittance characteristics, that is, there was a problem that the transmittance during the increase of voltage is different from that during the decrease of voltage. Accordingly, there was a problem of a phenomenon of image-sticking wherein a picture image which had appeared in the display just before the changing of picture remained in the present display for several minutes.

SUMMARY OF THE INVENTION

The present invention is to provide a liquid crystal display element having a high brightness and a high contrast ratio, capable of providing a clear gray scale display and reducing an image-sticking phenomenon due to the hysteresis of the liquid crystal and solidified matrix composite material.

In accordance with the present invention, there is provided a liquid crystal display element comprising a pair of substrates provided with electrodes and a liquid crystal and solidified matrix composite material, disposed between the pair of substrate, which includes a nematic liquid crystal dispersed and held in a solidified matrix, the nematic liquid crystal being such that the refractive index of the liquid crystal is changed depending on states of applying a voltage wherein in a state, the refractive index of the liquid crystal substantially coincides with that of the solidified matrix to thereby pass light, and in the other state, the former does not coincide with the latter to thereby cause the scattering of light, characterized in that the refractive index anisotropy $\Delta n$ of the liquid crystal used is 0.18 or higher, and the dielectric anisotropy $\Delta\epsilon_{LC}$ Of the liquid crystal used satisfies the relation of $5<\Delta\epsilon_{LC}<13$.

In accordance with the present invention, there is provided a projection type liquid crystal display apparatus comprising in combination a projection light source, a projection optical system and a liquid crystal display element comprising an active matrix substrate having an active element for each electrode for picture element, a counter electrode substrate provided with a counter electrode and a liquid crystal and solidified matrix composite material, interposed between the active matrix substrate and the counter electrode, which includes a nematic liquid crystal dispersed and held in a solidified matrix, the nematic liquid crystal being such that the refractive index of the liquid crystal is changed depending on states of applying a voltage wherein in a state, the refractive index of the liquid crystal substantially coincides with that of the solidified matrix to thereby pass light, and in the other state, the former does not coincide with the latter to thereby cause the scattering of light, characterized in that the refractive index anisotropy $\Delta n$ of the liquid crystal used for the liquid crystal and solidified matrix composite material is 0.18 or higher, and the dielectric anisotropy $\Delta\epsilon_{LC}$ of the liquid crystal used satisfies the relation of $5<\Delta\epsilon_{LC}<13$.

In another embodiment, the present invention has also been made to solve the subjects described above and to provide an active matrix liquid crystal display element of the type wherein a liquid crystal material is held between an active matrix substrate on which an active element is provided for each pixel electrode and a counter electrode substrate on which a counter electrode is provided, characterized in that the liquid crystal material is formed from a liquid crystal polymer composite wherein nematic liquid crystal is contained dispersively in a polymer matrix having a refractive index which coincides with the ordinary refractive index ($n_o$) of the liquid crystal used, and a polysilicon thin film transistor is used as the active element.

The present invention further provides a projection type active matrix liquid crystal display device of the type which includes an active matrix liquid crystal display element wherein a liquid crystal material held between an active matrix substrate on which an active element is provided for each pixel electrode and a counter electrode substrate on which a counter electrode is provided, a light source for projection light, and an optical system of projection, characterized in that the liquid crystal material is formed from a liquid crystal polymer composite wherein nematic liquid crystal is contained dispersively in a polymer matrix having a refractive index which coincides with the ordinary refractive index ($n_o$) of the liquid crystal used, and a polysilicon thin film transistor is used as the active element.

The present invention also provides a projection type active matrix liquid crystal display device of the type which includes an active matrix liquid crystal display element wherein a liquid crystal polymer composite composed of nematic liquid crystal dispersively contained in a polymer matrix having a refractive index which is substantially equal to the ordinary refractive index ($n_o$) of the liquid crystal used is held between an active matrix substrate on which an active element is provided for each pixel electrode and a counter electrode substrate on which a counter electrode is provided, a light source for projection light, and an optical system of projection, characterized in that the anisotropy of refractive index $\Delta n$ of the nematic liquid crystal used is greater than 0.18, and the average particle diameter $R(\mu m)$ of the liquid crystal dispersively contained in the polymer matrix and the distance $d(\mu m)$ between the active matrix substrate and the counter electrode substrate satisfy the relationships of $$0.3 < R \cdot \Delta n < 0.7 \tag{1B}$$

$$4R < d < 8R \tag{2B}$$

The present invention further provides a projection type active matrix liquid crystal display device which includes an active matrix liquid crystal display element wherein a liquid crystal material is held between an active matrix substrate on which an active element is provided for each pixel electrode and a counter electrode substrate on which a counter electrode is provided, a light source for projection light, and an optical system of projection, characterized in that the liquid crystal material used is a liquid crystal polymer composite wherein nematic liquid crystal is dispersively contained in a polymer matrix having refractive index which coincides with the ordinary refractive index ($n_o$) of the liquid crystal used, and the anisotropy of refractive index $\Delta n$ of the nematic liquid crystal used is greater than 0.18 while the average particle diameter $R(\mu m)$ of the liquid crystal dispersively contained in the polymer matrix and the distance $d(\mu m)$ between the active matrix substrate and the counter electrode substrate satisfy the relationships of $$0.3 < R \cdot \Delta n < 0.7 \tag{1B}$$

$$4R < d < 8R \tag{2B}$$

The present invention further provides a projection type active matrix liquid crystal display device of the type which includes a plurality of colored light sources, a plurality of active matrix liquid crystal display elements for individually receiving light from the colored light sources, and an optical system of projection for combining light emerging from the active matrix liquid crystal display elements and projecting the thus combined light, characterized in that each of the active matrix liquid crystal display elements is constituted such that nematic liquid crystal is dispersively contained in a polymer matrix between an active matrix substrate on which an active element is provided for each pixel electrode and a counter electrode substrate on which a counter electrode is provided, and the refractive indices of the polymer matrices substantially coincide with the ordinary refractive indices ($n_o$) of the liquid crystal used and the anisotropies of refractive index $\Delta n$ of the liquid crystal used are greater than 0.18 while the average particle diameters $R_x(\mu m)$ of the liquid crystal of the individual colors dispersively contained in the polymer matrices, the distances $d_x(\mu m)$ between the active matrix substrates and the opposing electrodes and the dominant wavelengths $\lambda_x$ of the colors of the individual light sources have the following relationship to the average particle diameter $R_G(\mu m)$ and the electrode distance $d_G(\mu m)$ where the dominant wavelength $\lambda_x$ of the light source of green is $\lambda_G$=540 nm $$0.3 < R_G \cdot \Delta n < 0.7 \tag{1A}$$

$$4R_G < d_G < 8R_G \tag{2A}$$

$$\frac{0.9 R_G}{\lambda_G} < \frac{R_X}{\lambda_X} < \frac{1.1 R_G}{\lambda_G} \tag{4B}$$

$$\frac{0.9 d_G}{\lambda_G} < \frac{d_X}{\lambda_X} < \frac{1.1 d_G}{\lambda_G} \tag{5B}$$

The present invention further provides a projection type active matrix liquid crystal display device of the type which includes a plurality of colored light sources, a plurality of active matrix liquid crystal display elements for individually receiving light from the colored light sources, and an optical system of projection for combining light emerging from the active matrix liquid crystal display elements and projecting the thus combined light, characterized in that each of the active matrix liquid crystal display elements is constituted such that nematic liquid crystal having a positive dielectric anisotropy is dispersively contained in a polymer matrix between an active matrix substrate on which an active element is provided for each pixel electrode and a counter electrode substrate on which a counter electrode is provided, and the refractive index of the polymer matrix substantially coincides with the ordinary refractive index ($n_o$) of the liquid crystal used and the anisotropy of refractive index $\Delta n$ of the liquid crystal used is greater than 0.18 while the average particle diameters $R(\mu m)$ of the liquid crystals of the individual colors dispersively contained in the polymer matrices, the electrode distances $d_x(\mu m)$ for the individual colors and the dominant wavelengths $\lambda_x$ of the colors of the individual light sources have the following relationship to the electrode distance $d_G(\mu m)$ where the dominant wavelength $\lambda_G$ of the light source of green is $\lambda_G$=540 nm $$0.3 < R \cdot \Delta n < 0.7 \tag{1B}$$

$$4R < d_G < 8R \tag{2B}$$

$$\frac{0.95 d_G}{\sqrt{\lambda_G}} < \frac{d_X}{\sqrt{\lambda_X}} < \frac{1.05 d_G}{\sqrt{\lambda_G}} \tag{5C}$$

The present invention further provides an active matrix liquid crystal display element of the type which includes a plurality of color filters disposed therein, characterized in that nematic liquid crystal having a positive dielectric anisotropy is dispersively contained in a polymer matrix between an active matrix substrate on which an active element is provided for each pixel electrode and a counter electrode substrate on which a counter electrode is provided, and the refractive index of the polymer matrix substantially coincides with the ordinary refractive index ($n_o$) of the liquid crystal used and the anisotropy of refractive index $\Delta n$ of the liquid crystal used is greater than 0.18 while the average particle diameters R($\mu$m) and the electrode distances $d_x$($\mu$m) of the liquid crystal of the individual colors dispersively contained in the polymer matrix and the dominant wavelengths $\lambda_x$ of transmission light through the individual color filters have the following relationships to the electrode distance $d_G$($\mu$m) where the dominant wavelength $\lambda_G$ of the light source of green is $\lambda_G$=540 nm $$0.3 < R \cdot \Delta n < 0.7 \tag{1B}$$

$$4R < d_G < 8R \tag{2B}$$

$$\frac{0.95 d_G}{\sqrt{\lambda_G}} < \frac{d_X}{\sqrt{\lambda_X}} < \frac{1.05 d_G}{\sqrt{\lambda_G}} \tag{5C}$$

The present invention additionally provides a projection type active matrix liquid crystal display device of the type which includes a projection light source, an active matrix liquid crystal display element having a plurality of color filters disposed thereon, and an optical system of projection for projecting light emerging from the active matrix liquid crystal display element, characterized in that the active matrix liquid crystal display element is composed of nematic liquid crystal having a positive dielectric anisotropy and dispersively contained in a polymer matrix between an active matrix substrate on which an active element is provided for each pixel electrode and a counter electrode substrate on which a counter electrode is provided, and the refractive index of the polymer matrix substantially coincides with the ordinary refractive index ($n_o$) of liquid crystal used and the anisotropy of refractive index $\Delta n$ of the liquid crystal used is greater than 0.18 while the average particle diameter R($\mu$m), the electrode distances $d_x$($\mu$m) of the liquid, crystals of the individual colors dispersively contained in the polymer matrix and the dominant wavelength $\lambda_x$ of transmission light through the individual color filters have the following relationship to the electrode distance $d_G$ where the dominant wavelength $\lambda_G$ of the light source of green is $\lambda_G$=540 nm $$0.3 < R \cdot \Delta n < 0.7 \tag{1B}$$

$$4R < d_G < 8R \tag{2B}$$

$$\frac{0.95 d_G}{\sqrt{\lambda_G}} < \frac{d_X}{\sqrt{\lambda_X}} < \frac{1.05 d_G}{\sqrt{\lambda_G}} \tag{5C}$$

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4' is a sectional view of an active matrix liquid crystal display element with color filters for use with a projection type active matrix liquid crystal display device according to the present invention.

DETAILED DESCRIPTION OF THE PREFERRED EMBODIMENTS

Figure 1:
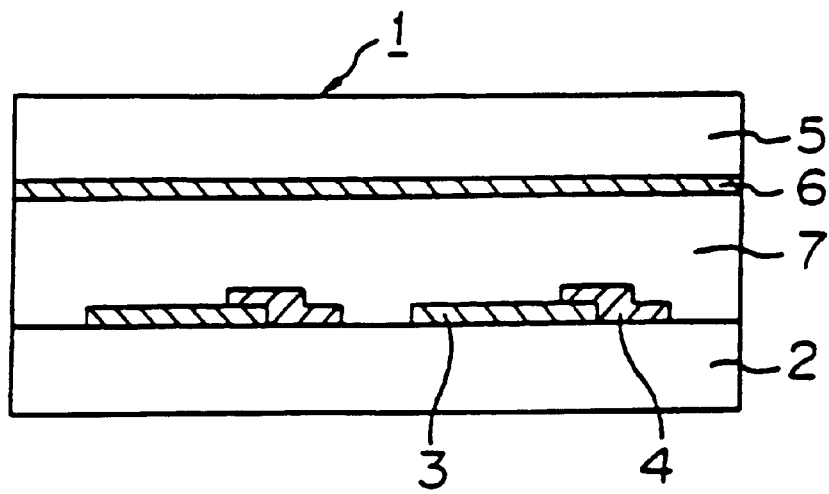
FIG. 1 is a diagram showing the basic construction of an embodiment of the liquid crystal display element of the present invention.

In accordance with the present invention having the above-mentioned construction, there is obtainable a liquid crystal display element which reduces an image-sticking phenomenon due to the hysteresis, has a high contrast ratio and can be driven at a low voltage.

In the present invention, a liquid crystal and solidified matrix composite material in which a nematic liquid crystal is dispersed and held in a solidified matrix is used. It is particularly preferable to use a liquid crystal and solidified matrix composite material in which a nematic liquid crystal having a positive dielectric anisotropy is dispersed and held in a solidified matrix, and the refractive index of the solidified matrix substantially coincides with that of the ordinary refractive index ($n_o$) of the liquid crystal used. The liquid crystal and solidified matrix composite material is interposed between a pair of substrates with electrodes, preferably, between an active matrix substrate having an active element for each electrode for picture element and a counter electrode substrate with a counter electrode.

The substrates with electrodes may be such one made of glass, plastics, ceramics or the like on which electrodes are formed.

The active matrix substrate is such one made of glass, plastics, ceramics or the like on which electrodes and active elements such as thin film transistors, (TFTs), thin film diodes, metal-insulation-metal-nonlinear resister device or the like are formed. A single or a plurality of active elements are connected to each of the picture element electrodes.

The counter electrode is such one made of glass, plastics, ceramics or the like on which electrodes are formed. The counter electrode is combined with the active matrix substrate so as to be capable of providing a display.

The liquid crystal and solidified matrix composite material is interposed between the above-mentioned substrates with electrodes. The liquid crystal and solidified matrix composite material is such one that the refractive index of liquid crystal in the liquid crystal and solidified matrix composite material is changed depending on a state of applying a voltage. When the refractive index of the solidified matrix substantially agrees with the refractive index of the liquid crystal, light is transmitted, and when the former does not agree with the latter, the light is scattered. Since no polarization plates are used, a bright display can be easily obtained.

The liquid crystal display element of the present invention can be used not only as a direct view type display element but also a projection type display element. When the liquid crystal display element of the present invention is used as the direct view type display element, a display apparatus may be constituted in combination with a backlight, a lens, a prism, a mirror, a diffusion plate, a light absorbing material, a color filter and so on in accordance with the display characteristics which are desired to obtain.

Further, the liquid crystal display element can be used for a shutter for laser beams or a reflection type display element.

The liquid crystal display element of the present invention is, in particular, suitable for a projection type display apparatus, and the projection type liquid crystal display apparatus can be constituted by combining the liquid crystal display element with a projection light source, a projection optical system and so on.

A conventional projection light source and a conventional projection optical system such as a lens may be used for the light source and the projection optical system. Generally, the liquid crystal display element is arranged between a projection light source and the projection lens.

In the liquid crystal display element of the present invention, a transparent-scattering type liquid crystal and solidified matrix composite material is interposed between the two substrates with electrodes, in particular, between the active matrix substrate and the counter electrode substrate. Specifically, according to the present invention, the liquid crystal display element comprising a liquid crystal and solidified matrix composite material in which a nematic liquid crystal is filled in a large number of fine holes formed in the solidified matrix, is used. The liquid crystal and solidified matrix composite material is put between the active matrix substrate and the counter electrode substrate. When a voltage is applied across the electrodes of the liquid crystal display element, the refractive index of the liquid crystal is changed, and the relation between the refractive index of the solidified matrix and the refractive index of the liquid crystal is changed. Namely, such a liquid crystal display element that when the refractive indices of the both members are in agreement with each other, a state of transmission is provided, and when not, a state of scattering is provided, can be used.

The liquid crystal and solidified matrix composite material comprising the solidified matrix having a large number of fine holes and the liquid crystal filled in the fine holes has such a structure that the liquid crystal is sealed in vacuoles such as microcapsules wherein the individual microcapsules may not be completely independent or the individual vacuoles may be communicated with each other through fine gaps like a porous material.

The liquid crystal and solidified matrix composite material used for the liquid crystal display element according to the present invention can be prepared as follows. A nematic liquid crystal and a curable compound for forming the solidified matrix are mixed to obtain a solution or a latex. Then, the solution or latex is cured by the application of light or heat, or by removing solvent or by subjection it to reactive curing thereby separate the solidified matrix and to disperse the liquid crystal in the solidified matrix.

Use of the photo-curable or heat-curable type compound is preferred since it can be cured in an enclosed system.

In particular, use of a photo-curable type compound is preferred since it can be cured in a short period of time with little influence of heat.

According to the present invention, where a light curable polymer is employed as a non-cured polymer for constituting an aforementioned liquid crystal polymer composite, preferably a light curable vinyl polymer is used.

In particular, a light curable acrylic polymer is listed as an example, and particularly a light curable acrylic polymer is used preferably which contains acrylic oligomer that polymerizes and cures by irradiation of light thereupon.

As a specific production method, the cell may be formed by using a sealing material, an uncured mixture of the nematic liquid crystal and the curable compound is injected from the injection port in the same manner as in the conventional nematic liquid crystal display element, and after sealing the injection port, they can be cured by light irradiation or heating.

The liquid crystal display element according to the present invention may also be prepared without using a sealing material, for example, by supplying an uncured mixture of the nematic liquid crystal and the curable compound on a substrate provided with a transparent electrode as a counter electrode, overlaying, on that substrate, an active matrix substrate having an active element for each picture element electrode and then curing the material by means of light-irradiation or the like.

The periphery of the display element assembly may be sealed by coating the sealing material. According to this production method, since it is only required to supply the uncured mixture of the nematic liquid crystal and the curable compound by means of coating such as roll coating, spin coating, printing or by the method of using a dispenser or the like, the injection step is simple and the productivity is extremely high.

Further, the uncured mixture of the nematic liquid crystal and the curable compound may be incorporated with spacers for controlling the inter-substrate gap such as ceramic particles, plastic particles or glass fibers, pigments, dyes, viscosity controllers or any other additives which does not adversely influence to the performance of the liquid crystal display element of the present invention.

During the curing step of the liquid crystal display element which shows a transparent state when a voltage is applied, if the element is cured under the condition that a sufficiently high voltage is applied to only a specified portion, it is possible to render that portion to be a state of normally light transmittance. Accordingly, when a fixed display is desired, such normally light transmittance portion may be formed.

On the contrary, in a case of using the display element which shows a scattering state when a voltage is applied, a normally scattering portion can be formed in the same manner as the above.

In the liquid crystal display element using the liquid crystal and solidified matrix composite material, higher transmittance in the light transmission state is preferable and the haze value in the light scattering state is preferably not less than 80%.

In the present invention, it is preferable that the refractive index of the solidified matrix (after curing) agrees with the ordinary refractive index ($n_o$) of the liquid crystal used, in a state of applying voltage.

Thus, light is transmitted when the refractive index of the solidified matrix agrees with the refractive index of the liquid crystal, while the light is scattered (opaque) when they do not agree with each other. The scattering property of the element is higher than that of the liquid crystal display element in the conventional DS mode and a display having a high contrast ratio can be obtained.

The major object of the present invention is to provide a liquid crystal display element capable of being driven at a low voltage while an image-sticking phenomenon due to the hysteresis of a liquid crystal and solidified matrix composite material is minimized. The liquid crystal display element can provide a high performance such as a high density display in combination with active elements. The liquid crystal display element of the present invention also has excellent performance in another usage (an optical shutter, a display, a spatial light modulator and so on) which requires a halftone display.

In the conventional liquid crystal and solidified matrix composite material, there appeared hysteresis in the voltage-transmittance characteristics, this causing a trouble in gray-scale displaying. The hysteresis is a phenomenon that transmittance is different between a course of increasing the voltage and a course of decreasing the voltage. If the hysteresis exists, an information which has appeared in a picture image remains in gray-scale displaying. Namely, the image-sticking is apt to occur to thereby deteriorate the quality of picture image.

As one of the causes which produce the hysteresis in the liquid crystal and solidified matrix composite material, there is a structure in the composite material wherein the liquid crystal is dispersed and held in the solidified matrix. Namely, it is considered that there is the hysteresis by the interaction of the liquid crystal existing in the solidified matrix in a separate form. The magnitude of the hysteresis is determined by an elastic energy stored in the liquid crystal held in the solidified matrix, an electric energy caused by an electric field applied from the outside and energy by the interaction of the liquid crystal existing in a separate form in the solidified matrix. Accordingly, the hysteresis can be reduced by optimizing balance of the energies, and an excellent display in which there is no image-sticking can be obtained even in a gray-scale display.

It is an object of the present invention to provide a liquid crystal display element having a high contrast ratio, high brightness and excellent response and capable of reducing hysteresis. Further, the object of the present invention is to obtain a liquid crystal display element which can be driven with use of a conventional TN active element and a conventional driving circuit.

It is in particular important that the dielectric constant and the dielectric anisotropy $\Delta\epsilon_{LC}$ of the liquid crystal and the dielectric constant $\epsilon_p$ of the solidified matrix are balanced in order to reduce the hysteresis resulted from the fact that the liquid crystal particles are dispersed in the solidified matrix. This is because these factors primarily determine interaction of the liquid crystal particles dispersed in the solidified matrix. It is preferable that the dielectric anisotropy $\Delta\epsilon_{LC}$ of the liquid crystal used satisfies the following relation in order to reduce the hysteresis:

$$5 < \Delta\epsilon_{LC} < 13 \tag{1}$$

The value $\Delta\epsilon_{LC}$ is a quantity related to both the hysteresis and a driving voltage wherein the upper limit of the quantity is determined by the magnitude of the hysteresis and the lower limit is determined by the driving voltage. The above-mentioned condition is apparently disadvantageous from common knowledge on the conventional TN type liquid crystal display element that the larger the value $\Delta\epsilon_{LC}$ is the lower the driving voltage is. However, such view on the conventional TN type liquid crystal display element wherein the driving voltage is in inverse proportion to the square root of $\Delta\epsilon_{LC}$ is not established in a system in which the liquid crystal particles are dispersed, because a distribution of voltage in a liquid crystal portion and a matrix portion varies depending on arrangement of the liquid crystal. In the liquid crystal and solidified matrix composite material of the present invention, $\Delta\epsilon_{LC}$ does not much influence to the driving voltage. If $\Delta\epsilon_{LC}$ is determined to be larger than 5, the driving voltage does not become extremely high by reducing $\Delta\epsilon_{LC}$. When a liquid crystal in which $\Delta\epsilon_{LC}$ is extremely large is used, there is a problem that temperature dependence of the elastic constant directly causes temperature dependence of the voltage-transmittance characteristics. Accordingly, the value $\Delta\epsilon_{LC}$ should have the above-mentioned range. The range of $\Delta\epsilon_{LC}$ will be discussed in more detail with respect to explanation on the elastic constant. The anisotropy of relative dielectric constant $\Delta\epsilon(=\epsilon//-\epsilon\perp)$ is preferably greater than 10.

It is preferable that the dielectric constant $\epsilon_M$ of the liquid crystal and solidified matrix composite material at a sufficiently low voltage which is lower than the threshold voltage, and the dielectric anisotropy $\Delta\epsilon_{LC}$ of the liquid crystal used have the relation:

$$\Delta\epsilon_{LC} < 1.45\, \epsilon_M \tag{2}$$

in order to reduce the hysteresis.

When $\Delta\epsilon_{LC}$ exceeds that range, movement of the liquid crystal in a single liquid crystal particle causes a large change of dielectric constant in that particle. As a result, a large change of electric field is created around the particle, whereby an electrical interaction between liquid crystal particles, which is the major factor to cause the hysteresis, becomes large. The $\epsilon_M$ is a quantity related to the dielectric constant $\epsilon_p$ of the solidified matrix. When the dielectric constant $\epsilon_p$ of the solidified matrix increases, the dielectric constant $\epsilon_M$ of the liquid crystal and solidified matrix composite material will increase, whereby the available range of $\Delta\epsilon_{LC}$ will expand.

The value of the refractive index anisotropy $\Delta n\ (=n_e-n_o)$ of the liquid crystal used should be 0.18 or larger in order to increase the scattering property without applying an electric field to thereby obtain a high scattering property. Specifically, it is preferable to be $\Delta n \geq 0.20$. Further, the ordinary refractive index $n_o$ of the liquid crystal used preferably substantially agrees with the refractive index $n_p$ of the solidified matrix. In this case, a high transmittance property can be obtained when an electric field is applied. Specifically, it is preferable to satisfy the relation of $n_o-0.03 < n_p < n_o+0.05$.

Factors which determine electro-optic characteristics of an active matrix liquid crystal display element which employs such a liquid crystal polymer composite as described above include refractive indices (ordinary refractive index $n_o$ and extraordinary refractive index $n_e$) relative dielectric constants ($\epsilon//$ and $\epsilon\perp$, $//$ and $\perp$ denote parallelism and perpendicularity to a molecular axis of the liquid crystal, respectively), a viscosity and a modulus of elasticity of liquid crystal used, and a refractive index $n_p$, a relative dielectric constant $\epsilon_p$ and a modulus of elasticity of a polymer used as well as an average particle diameter R of the liquid crystal dispersively contained in the polymer matrix, a volume fraction of liquid crystal $\Phi$, a distance d between a pair of electrode plates (thickness of the liquid crystal polymer composite), a maximum root mean square of applied voltage V to be applied to a picture element portion of the liquid crystal polymer composite from an active element, and so forth. Here, the liquid crystal average particle diameter R denotes, when the liquid crystal presents the form of substantially spherical vacuoles, an average diameter of such spheres, but when the liquid crystal has a porous structure, an average diameter of regions in which directors of the liquid crystal are related to each other.

An active matrix liquid crystal display element which employs the liquid crystal polymer composite according to the present invention desirably has an electro-optic characteristic that it has a high light scattering property when no electric field is applied thereto but has a high transmittance when an electric field is applied thereto, that is, it has a high display contrast ratio. Where a display of the projection type is made using such liquid crystal display element, a display can be obtained which is high in brightness and high in contrast ratio.

In order to obtain such display, it is necessary for the factors listed above to have optimum relationships.

Particularly important ones of the factors which determine electro-optic characteristics of an active matrix liquid crystal display element are a refractive index (anisotropy of refractive index $\Delta n$=extraordinary refractive index $n_e$–ordinary refractive index $n_o$) of liquid crystal used, an average particle diameter R of the liquid crystal and a distance d between a pair of electrode substrates. In the case of a multi-color display, an average particle diameter $R_x$ and an electrode substrate distance $d_x$ are determined for optimization for each liquid crystal display element in accordance with a dominant wavelength $\lambda_x$ of a colored light source.

Although the hysteresis in the liquid crystal and solidified matrix composite material is caused mainly by the above-mentioned factors, an electro-optical hysteresis as an optical element or a display element is not determined solely by the above-mentioned elastic energy, electrical energy and interaction energy. Namely, the optical hysteresis depends also on how the hysteresis is optically influenced by the arrangement of the liquid crystal. For instance, even though there is a region of the hysteresis by the arrangement of the liquid crystal, there is no electro-optical hysteresis as long as the region does not optically influence at all.

The major factor to connect the arrangement of the liquid crystal to the optical characteristics is the refractive index anisotropy $\Delta n$ of the liquid crystal because the magnitude of $\Delta n$ determines the relation between a change of the arrangement of the liquid crystal and a change of optical properties. When $\Delta n$ is large, a change of the refractive index of a portion becomes large in a case that the arrangement of the liquid crystal is changed by an outer field such as an electric field, whereby the change of the arrangement of the liquid crystal largely influences optical properties. When $\Delta n$ is small, there is no large optical change as far as the arrangement of the liquid crystal does not largely changed.

Accordingly, as $\Delta n$ large, the hysteresis by the arrangement of the liquid crystal creates a large electro-optical hysteresis. In other words, the amplification factor from the voltage dependency of the arrangement of the liquid crystal to the optical characteristics becomes large as $\Delta n$ is large.

In view of the above, it is desirable that $\Delta n$ is smaller than a certain level in order to reduce the electro-optical hysteresis. Specifically, it is desirable to satisfy the relation of $\Delta n \leq 0.25$, more preferably, $\Delta n \leq 0.24$.

Further, the driving voltage is primary determined by the diameter of the liquid crystal particles and a distribution of the particles. Regarding to the diameter of the liquid crystal particles, it is preferable that the diameter of the liquid crystal particles in average (average particle diameter) R of the liquid crystal and solidified matrix composite material is in a range of:

$$0.2 < \Delta n \cdot R < 0.7 \qquad (3)$$

A value within that range is required because the scattering property becomes large at the time of applying no electric field and the liquid crystal is driven at a low electric field in a case of using a display element wherein the refractive index of the liquid crystal agrees with the refractive index of the solidified matrix at the time of application of an electric field.

The average particle diameter R of liquid crystal dispersively contained in a polymer matrix is a very important factor and contributes to a light scattering property when no electric field is applied and also to an operation characteristic of the liquid crystal when an electric field is applied. The light scattering property when no electric field is applied varies depending upon a relationship among the anisotropy of refractive index $\Delta n$ of liquid crystal used, the wavelength $\lambda$ of light and the average particle diameter R of the liquid crystal.

Therefore, in the case of an ordinary white and black display, the average particle diameter R($\mu$m) and the electrode substrate distance d($\mu$m) are set in the following manner:

$$0.3 < R \cdot \Delta n < 0.7 \qquad (1B)$$

$$4\, R < d < 8\, R \qquad (2B)$$

Further, in this instance, as the liquid crystal display element is driven such that the maximum root mean square of applied voltage V(V) to be applied to the liquid crystal polymer composite may satisfy the relationship of $$0.5\, R \cdot V < d < R \cdot V \qquad (3B)$$

a display of a high contrast ratio can be made with a low voltage.

In case a display is to be made in a plurality of colors, the average particle diameter $R_x$ and the electrode substrate distance $d_x$ must necessarily be set for each liquid crystal display element in the following manner in order to maximize the light scattering property per unit operation liquid crystal amount in accordance with a dominant wavelength $\lambda_x$ of each light source.

It is to be noted that, where the dominant wavelength $\lambda_G$ of a light source of green is $\lambda_G$=540 nm, the average particle diameter is denoted by $R_G(\mu m)$ and the electrode substrate distance is denoted by $d_G(\mu m)$.

$$0.3 < R_G \cdot \Delta n < 0.7 \qquad (1A)$$

$$4\, R_G < d_G < 8\, R_G \qquad (2A)$$

Particularly since the color of the light source is green, it is preferable to have a condition of $0.4 < R_G \cdot \Delta n < 0.6$, and in case Δn=0.25 or so, $R_G$ is 2.0 μm or so. Further, it is preferable for Δn to be greater than 0.2 in order to obtain a high light scattering property.

Where the average particle diameter $R_G$ of a liquid crystal display element with respect to the light source of green is smaller than the range defined by the equation (1A) above, the light scattering property has a wavelength dependency wherein it is higher on the short wavelength side, and since a higher electric field is required for operation of the liquid crystal, another problem takes place that power consumption increases. On the contrary, in case the average particle diameter $R_G$ is greater than the range of the equation (1A), the wavelength dependency of the light scattering property decreases but the light scattering property is low over the entire visible radiation region. Consequently, such problems take place that the contrast ratio is deteriorated and that the response time from a transmitting condition to a scattering condition becomes slow. As a result, the range defined as above is adopted.

Control of such average particle diameters may be obtained by control of a composition, a temperature upon curing, an irradiation intensity of light, an irradiation time and so forth, and conditions therefor may be determined experimentally.

Δn is closely related to the temperature dependence of the electro-optical characteristics of the liquid crystal and solidified matrix composite material. When Δn greater than or equal to 0.18, the optimum diameter of the liquid crystal particles as defined in the equation (3) exists, whereby an element having high scattering property or transmitting property is obtained at an OFF time. However, the temperature dependence largely varies depending on the value Δn. The scattering property per a single liquid crystal particle at an OFF time is the function of X=Δn·R/λ (λ:wavelength). The scattering property initially increases as the value X increases. However, it assumes gradually a constant value, and thereafter, the scattering property decreases. Accordingly, if an element is constituted under conditions that the scattering property or the transmitting property becomes constant, it is possible to obtain such an element that the scattering property or the transmitting property at the OFF time is not substantially changed regardless of a change of Δn. In this case, there is an advantage that the scattering property is not easily changed in response to a change of wavelength, whereby an element wherein the scattering property or the transmitting property at an OFF time is less influenced by wavelength. Accordingly, it is easy to obtain a balance in colors in a color display. Specifically, the value Δn to satisfy the above-mentioned conditions is in a range of 0.18≦Δn≦0.25. An element having a value Δn in the above-mentioned range and a value R defined in the equation (3) can remarkably reduce a change of the scattering property or the transmitting property due to a change of temperature at an OFF time. For instance, in the element having Δn=0.21 and R=2.4 μm, there is no substantial change in the scattering property or the transmitting property at an OFF time in a temperature range near the room temperature (for instance, in a range of 0–60° C.).

Since the liquid crystal and solidified matrix composite material, when it is driven in a 2-state display without gray scale, is driven between an OFF state and a sufficiently high (saturated voltage or higher) ON state, it shows a response at several tens msec or lower, and accordingly, it is generally suitable for a high speed display. However, when a gray scale display is carried out, a voltage lower than the saturated voltage can be used in order to display a half tone. Accordingly, the response becomes sometimes slower than that at the 2-state display driving mode. The responding property at the gray scale displaying time shows a tendency of a slower responding property as the display is conducted at a low voltage side (i.e. a dark display). In particular, when the display is changed from an OFF state to a low transmitting state, the responding property is the slowest, and the responding property is sometimes several tens times or more as slow as the responding property at the static 2-state display driving time.

In order to reduce a residual image in the gray scale display, it is preferable that the refractive index anisotropy Δn and the viscosity η(cSt) of the liquid crystal dispersed and held in the solidified matrix are in a relation:

$$\Delta n^2/\eta > 0.001 \tag{4}$$

In particular, it is preferable that they satisfy the following equation in order to provide good responding property at the OFF time of voltage:

$$\Delta n^2/\eta > 0.0014 \tag{4A}$$

Further, it is preferable to satisfy the following relation:

$$5(K33/\eta)^{0.5} > R > (K33/\Delta\epsilon_{LC})^{0.5} \tag{5}$$

In particular, it is preferable to satisfy the following relation:

$$4(K33/\eta)^{0.5} > R > (K33/\Delta\epsilon_{LC})^{0.5} \tag{5A}$$

In the above-mentioned ranges, a torque acting on the liquid crystal at each voltage in the gray scale display is balanced whereby the display with few residual image can be obtained, and the electric field needed to drive the liquid crystal can be suppressed to be low. The above-mentioned physical values of the liquid crystal are values in terms of room temperature.

The above-mentioned relations are applicable to a case that the shape of the liquid crystal particles is substantially spherical. In the present invention, however, the effect of reducing the hysteresis can be improved by deforming the shape of the liquid crystal particles into a shape other than a spherical shape. In this case, a shape having complicated projections and recesses is not preferable because an extremely high driving electric field is needed although the responding property is excellent. Accordingly, it is preferable that the shape of the liquid crystal particles is a rotating elliptic form. Further, in this case, when the long axis of the rotating elliptic liquid crystal particles is arranged in a specified direction, the above-mentioned effect can not be obtained. Therefore, the long axis of the liquid crystal particles should be arranged in random with respect to the normal line to the electrode surface, namely, the long axis of the liquid crystal particles should be arranged in a two-dimensional manner, preferably in a three-dimensional manner.

Regarding to the above-mentioned relations, the average particle diameter R of the liquid crystal is closely related to the scattering property, the responding property, operating electric field and so on. When R becomes large, an electric field necessary for driving becomes small and the responding property becomes slow. When R becomes small, an elastic energy accumulated per unit quantity of liquid crystal becomes large and the responding speed becomes fast. However, a high electric field is needed to drive the display element.

The viscosity η and the dielectric anisotropy $\Delta\epsilon_{LC}$ anisotropy of the liquid crystal are also factors deeply related to the response property. As the viscosity is small or the dielectric anisotropy is large, the response speed becomes faster. Further, $\Delta\epsilon_{LC}$ is also related to an electric field necessary to drive the liquid crystal. As $\Delta\epsilon_{LC}$ is large, a necessary electric field becomes smaller.

The elastic constant of the liquid crystal determines an elastic energy to be accumulated in the liquid crystal. A bend energy derived from the elastic constant K33 particularly greatly functions in the liquid crystal and solidified matrix composite material, and the bend energy deeply concerns with the response characteristics and the driving characteristics, i.e. the elastic torque acting on the liquid crystal. Although it is advantageous that the elastic constant K33 is large in order to reduce the hysteresis, an excessively large K33 will increase a driving electric field. Accordingly, the value K33 can be selected in consideration of a balance on the other physical properties of the liquid crystal (such as $\Delta n$, $\Delta\epsilon_{LC}$, $\eta$ and so on). Further, since the voltage-transmittance characteristics of the liquid crystal has temperature dependence, it is necessary to optimizes the dielectric anisotropy $\Delta\epsilon_{LC}$ and the elastic constants K11, K33 of the liquid crystal, which are physical quantities changeable depending on temperature, in addition to the before-mentioned relation between $\Delta n$ and R.

Since the liquid crystal is dispersed and held in the solidified matrix in the liquid crystal and solidified matrix composite material, it is not always that the entire voltage is applied to the liquid crystal, but the voltage is shared between a liquid crystal portion and a matrix portion. Generally, when $\Delta\epsilon_{LC}$ of the liquid crystal is larger, the larger dielectric constant $\epsilon//$ of the liquid crystal is larger, whereby the voltage shared by the matrix increases at the application of voltage and the voltage shared by the liquid crystal portion decreases. Accordingly, there is no substantial effect to reduce the driving voltage in a region having a large value of $\Delta\epsilon_{LC}$ even though the value $\Delta\epsilon_{LC}$ is made large. From this reason, when the value $\Delta\epsilon_{LC}$ is large, the elastic constant mainly determines the voltage transmittance characteristics. Accordingly, when the liquid crystal having a larger $\Delta\epsilon_{LC}$ is used, the temperature dependence of the elastic constant has direct connection to the temperature dependence of the voltage transmittance characteristics. On the other hand, as the $\Delta\epsilon_{LC}$ is made small, the voltage shared by the liquid crystal portion increases, and the voltage-transmittance characteristics are determined by the proportion of $\Delta\epsilon_{LC}$ and the elastic constant. The value $\Delta\epsilon_{LC}$ and the elastic constant are both physical quantities which decrease with a temperature rise. Accordingly, by selecting the physical quantities suitably to thereby cancel respective changes of temperature, a liquid crystal and solidified matrix composite material having voltage-transmittance characteristics which are substantially free from temperature dependence or has a little temperature dependence can be obtained.

In view of the above, it is preferable that the dielectric anisotropy $\Delta\epsilon_{LC}$ of the liquid crystal is in a range of $\Delta\epsilon_{LC}<13$ and the elastic constant K ($K=(K11+K33)/2$) ($10^{-12}$N) satisfies the condition of $1<K/\Delta\epsilon_{LC}$. When $K/\Delta\epsilon_{LC}$ is too large, the driving voltage increases. Accordingly, it is preferable that $K/\Delta\epsilon_{LC}<3$.

The clearing point Tc (the transition temperature from liquid crystal to an isotropic liquid) is also important for the temperature dependence. The above-mentioned function can not be expected unless Tc is higher to a certain extent than an operating temperature range because the change of the physical quantities is very abrupt at a temperature near the transition point. Accordingly, the clearing point Tc of the liquid crystal used should not be lower than either higher temperature of "the center temperature of the operating temperature range +30° C." or "the upper operating temperature +10° C.". In a case of the temperature range of 0° C.–60° C. as described above, Tc should not be lower than 70° C.

It is preferable that the liquid crystal dispersed and held in the solidified matrix is formed of liquid crystal particles which are independent from each other or partially connected liquid crystal particles. The liquid crystal of this kinds effectively function to provide a high scattering property and a high transmittance at a low driving voltage. A scattering phenomenon is resulted at the interface between the liquid crystal and a matrix material. A greater surface area of the interface improves the scattering property.

When the surface area of the interface is to be increased with a certain average particle diameter of the liquid crystal particles, it is important that an amount of the liquid crystal is increased independent of the solidified matrix, namely, the density of the liquid crystal particles is made large. However, when an amount of the liquid crystal is made large separate from the solidified matrix, some liquid crystal particles will be connected, and finally, all liquid crystal particles are connected to each other. Such structure of the liquid crystal will reduce the scattering property because the interface between the liquid crystal and the solidified matrix which are separated from each other, disappears.

Further, it is important for lowering the driving voltage that liquid crystal separately held in the solidified matrix has the substantially an equal driving electric field. For this purpose, a clear interface should be formed between the liquid crystal and the solidified matrix. The loss of the interface scatters the driving electric field, whereby reduction of the contrast ratio and increase in the driving voltage are apt to occur. It is, therefore, preferable that the liquid crystal dispersed and held in the solidified matrix is constituted by independent particles or partially connected particles in a high density state.

It is preferable that the particle diameter of the liquid crystal is uniform. If there is a distribution in the particle diameter, larger liquid crystal particles reduce the scattering property and smaller liquid crystal particles raises electric field for driving, with the result of inviting the raise of driving voltage and the reduction of contrast. The dispersion $\sigma$ of the particle diameter is preferably not less than 0.25 times as the average particle diameter, more preferably, not less than 0.15 times. The above-mentioned average particle diameter and dispersion are respectively volume-weighed values.

Liquid crystal to be used should be selected in consideration of the dielectric anisotropy $\Delta\epsilon_{LC}$ shown in the equations (1) and (2) and the relation between the refractive index anisotropy and the average particle diameter as shown in the equation (3). Specifically, $\Delta n$ should be 0.18 or higher.

In a case of using an element which shows a transparent state at the time of applying an electric field, when the electrode substrate gap d is increased, the scattering property at the time of applying no electric field is improved. However, the value d is excessively large, a high voltage is required to achieve a sufficient transparent property at the time of applying an electric field, this resulting problems of an increase of electric power and unabling to use conventional TN active elements and driving ICs. On the contrary, when the value d is made small, the scattering property at the time of applying no electric field decreases although high transparency is obtainable at a low voltage.

Therefore, in order to satisfy both the scattering property at the time of applying no electric field and the high transparency at the time of applying an electric field, it is preferable that the electrode substrate gap d ($\mu$m) satisfies:

$$3R<d<9R \tag{6}$$

and further, the maximum effective voltage (V) applied to the liquid crystal and solidified matrix composite material satisfies:

$$0.6\ R\cdot V<d<1.6\ R\cdot V \tag{7}$$

As far as these values are in the above-mentioned ranges, the conventional active element and the conventional driving IC for TN can be used to obtain a display having a high contrast ratio.

When the above-mentioned element is applied to a reflection type display apparatus, the scattering property at the time of scattering increases because light passes twice in the liquid crystal and solidified matrix composite material. Accordingly, it is possible to decrease the value d within the range of the equation (6), and also, the maximum driving voltage determined by the equation (7) can be reduced.

In the above explanation, use of a single liquid crystal display element has been explained. However, when three liquid crystal display elements are used for a projection type liquid crystal display apparatus wherein three kinds of light (R, G and B) are caused to pass through each liquid crystal display element, the above-mentioned equations have to be satisfied for each color. Further, the characteristics of the liquid crystal element should be adjusted for each color. Specifically, it is preferable that the relation of $\Delta n$, R and d of the liquid crystal display element to the center wavelength $\lambda$ of light used is adjusted to simultaneously satisfy the equations (8) and (9) mentioned below, or the values in the following equation (10) are substantially uniform in each color. When such equations are satisfied, the transparent-scattering property having uniform colors of light can be obtained.

$$\Delta n_i \cdot R_i / \lambda_i \approx \Delta n_j \cdot R_j / \lambda_j \tag{8}$$

$$d_i / R_i \approx d_j / R_j \tag{9}$$

$$\Delta n_i \cdot d_i^2 / \lambda_i \approx \Delta n_j \cdot d_j^2 / \lambda_j \tag{10}$$

wherein i and j represent colors.

In order to improve the scattering property when no electric field is applied, it is effective to increase the volume fraction $\Phi$ of the liquid crystal which is operable in the liquid crystal and solidified matrix composite material. The range of $\Phi>20\%$ is preferred. In order to obtain higher scattering property, it is preferable to be $\Phi>35\%$, more preferably $\Phi>45\%$. On the other hand, when the value $\Phi$ is excessively high, the stability in structure of the liquid crystal and solidified matrix composite material becomes inferior. Accordingly, it is preferable that $\Phi<70\%$.

In the liquid crystal display element of the present invention wherein the ordinary refractive index ($n_o$) of the liquid crystal coincides with the refractive index of the solidified matrix, a scattering state (i.e., an opaque state) is shown due to a difference in refractive index between the liquid crystal not in an oriented condition to normal direction of a substrate and the solidified matrix when no electric field is applied. Accordingly, light is scattered by a portion of the liquid crystal display element at which no electrode is located. When said liquid crystal element is used for a projection type display apparatus, the portion other than picture elements looks dark because light does not reach a projection screen without light shielding layer at said portion. In order to prevent light from leaking from any other portion of the liquid crystal display element than the picture element electrodes, it is unnecessary to provide a light shielding layer for the portion other than the picture element electrodes. Accordingly, there is an advantage that the step of forming the light shielding layer is unnecessary.

An electric field is applied to a desired picture element. At the picture element portion to which the electric field is applied, the liquid crystal is oriented to the direction of field, so that the ordinary refractive index ($n_o$) of the liquid crystal and the refractive index ($n_p$) of the solidified matrix coincide with each other. Accordingly, the liquid crystal display element presents a transparent state, and light is transmitted through desired picture elements to thereby provide a bright display on a projection screen.

In the liquid crystal display element of the present invention, a colored display can be attained by providing a color filter. Color filters having different three colors may be provided in a single liquid crystal display element, or a color filter for a specified color may be provided in a single liquid crystal display element and three liquid crystal display elements having different color filters may be used in combination. The color filter may be provided on the surface having electrodes of the substrate or may be provided at the outside of the substrate.

Further, dye, pigment or the like may be mixed into the liquid crystal and solidified matrix composite material to conduct a color display.

In a projection type active matrix liquid crystal display device of the present invention, since an active matrix liquid crystal display element is used wherein a liquid crystal material to be held between an active matrix substrate and a counter electrode substrate is a liquid crystal polymer composite which can be electrically controlled between a scattering condition and a transmitting (transparent) condition, no polarizing plate is required, and the transmittance of light upon transmitting condition can be improved significantly. Further, since the average particle diameter R($\mu$m) and the electrode distance d($\mu$m) of the liquid crystal polymer composite are set individually, when colors are mixed upon projection display, a display of a high contrast ratio can be obtained. Particularly where the average particle diameters $R_x$($\mu$m) and the electrode distances $d_x$($\mu$m) of the liquid crystal polymer composite are set for individual colors, when colors are mixed upon projection display, a display can be obtained which is good in color balance and high in brightness and also in contrast ratio.

Further, since possible problems of destruction of active elements upon an orientation processing necessary for a liquid crystal display element of the TN type or by static electricity generated inadvertently can be avoided, the yield in production of liquid crystal display elements can be improved significantly.

Moreover, since the liquid crystal polymer composite presents the form of a film after curing thereof, such problems as short-circuiting between substrates by pressure thereupon and destruction of active elements by displacement of a spacer do not take place easily.

Meanwhile, the liquid crystal polymer composite is similar in specific resistance to that in the conventional TN mode, and a great storage capacitor need not be provided for each pixel element as in the DS mode. Consequently, designing of active elements can be facilitated and power consumption of liquid crystal display elements can be restricted to a low level. Accordingly, liquid crystal display elements can be produced by a conventional process of production of liquid crystal display elements of the TN mode without an orientation process of liquid crystal, and accordingly, production of them is easy. The specific resistance of the liquid crystal polymer composite is preferably higher than $5 \times 10^9$ Ωcm. Further, in order to minimize the voltage drop by a leak current and so forth, the specific resistance should preferably be higher than $10^{10}$ Ωcm, and in this instance, there is no necessity of provision of a large storage capacitor for each pixel electrode.

An active element provided for each pixel element may be a transistor, a diode, a non-linear resistor element or the like, and where it is necessary, two or more active elements may be disposed for each pixel. The liquid crystal polymer composite described above is held between an active matrix substrate on which such active elements and pixel electrodes connected to the active elements are provided and a counter electrode substrate on which a counter electrode is provided to make a liquid crystal display element. In the present invention, it is preferable to use a polysilicon thin film transistor (p-Si TFT) as such active element. This is because, where the liquid crystal element is used with a projection type display device, even if light is received from an intense projection light source, the TFT will not be influenced by the light to cause an operation in error and the display device will not make an error display frequently.

Moreover, in the present invention, an amorphous silicon TFT (a-Si TFT) also may be used as such active element with light shielding layer. In the case of using a-Si TFT, it is necessary to provide a light shielding layer in order to reduce the operational error of TFT caused by the light from the projection light source.

While a projection type active matrix liquid crystal display device of the present invention may include a single projection light source and single optical system of projection, it is preferable to use a plurality of colored light sources and optical systems of projection where a plurality of liquid display elements are used to make a multi-color display. A conventionally known projection light source and optical system of projection such as a lens can be employed for such light source and optical system of projection, respectively, and where a plurality of liquid crystal display elements are used to make a multi-color display, the liquid crystal display elements may be disposed corresponding to the individual colored light sources such that images therefrom may be combined for projection.

Such colored light sources may be light sources for individual colors or may be obtained by separation of light from a single light source. Beams of light emerging from the colored light sources are introduced into an active matrix liquid crystal display element or elements. According to the present invention, a plurality of active matrix liquid crystal display elements are used in accordance with their characteristics of the individual colors. Beams of light emerging from the active matrix liquid crystal display elements are mixed and then projected. Consequently, a projection image can be obtained which is bright, good in color balance and high in contrast ratio.

According to the present invention, a liquid crystal polymer composite is used which is composed of a polymer matrix having a large number of fine holes or pores formed therein and nematic liquid crystal filled in the holes of the polymer matrix, the refractive index of the polymer matrix being substantially equal to the ordinary refractive index ($n_o$) of the liquid crystal used, the anisotropy of refractive index Δn of the liquid crystal being greater than 0.18. The liquid crystal polymer composite is held between an active matrix substrate and a counter electrode substrate to make a liquid crystal display element. The refractive index of the liquid crystal varies in response to an applied condition of a voltage between the electrodes of the liquid crystal display element, and thereupon, the relationship between the refractive index of the polymer matrix and the refractive index of the liquid crystal varies. When the refractive indices of them coincide with each other, the liquid crystal display element presents a transmitting condition, but the refractive indices are different for each other, the liquid crystal display element presents a scattering condition.

The liquid crystal polymer composite for use with a liquid crystal display element of the present invention may be produced such that nematic liquid crystal material and a prepolymer for constituting a polymer matrix are mixed with each other into the condition of solution or latex, which is then caused to cure by light or heat or by removal of solvent or else by a reaction to separate the polymer matrix so as to reach a condition wherein the nematic liquid crystal is dispersed in the polymer matrix.

Preferably, the polymer used is of the light curable type or of the heat curable type so that it can be cured in an enclosed system.

Particularly a polymer of the light curable type is preferable because it is little influenced by heat and can be cured in a short period of time.

According to an exemplary process of production of a liquid crystal polymer composite, a cell is formed using a seal material similarly as in the case of conventional ordinary nematic liquid crystal, and non-cured mixture of nematic liquid crystal and a material for constituting a polymer matrix is filled into the cell by way of a filling port, whereafter the filling port is closed an either light is irradiated upon the mixture or the mixture is heated to cure the mixture.

Meanwhile, in the case of a liquid crystal display element of the present invention, a liquid crystal resin compound material can be produced without using a seal material. For example, non-cured mixture of nematic liquid crystal and a polymer matrix may be supplied onto a substrate on which a transparent electrode is provided as a counter electrode, whereafter an active matrix substrate on which an active element is provided for each pixel electrode is placed on the opposing electrode substrate and then light is irradiated upon the mixture to cure the mixture.

Naturally, a seal material may be applied on a periphery of the liquid crystal resin compound material to seal the latter after then. According to the process, since non-cured mixture of nematic liquid crystal and a polymer matrix must only be supplied by roll coating, spin coating, printing, application by means of a dispenser or the like, the filling step is simple and the productivity is high.

Further, a spacer for controlling the distance between substrates such as ceramic particles, plastic particles, a glass fiber a pigment, a coloring matter, a viscosity controlling agent or any other additive which does not have a bad influence on performances of a liquid crystal display element of the present invention.

If a sufficiently high voltage is applied to a particular portion of the liquid crystal display element during a curing step, then the portion of the liquid crystal display element becomes transparent in on and off state (a normally transmitting condition). Accordingly, when it is intended to provide a fixed indication, such a normally transmitting portion may be formed in the liquid crystal display element.

The response time of a liquid crystal display element of the present invention which employs such a liquid crystal polymer composite as described above is 3 to 50 msec or so as a rising time upon application of a voltage and 10 to 80 msec as a falling time upon removal of the voltage and is thus quicker than a conventional liquid crystal display element of the TN mode.

Further, the electro-optical characteristics of voltage-transmittance dependency of the liquid crystal display element is looser than a conventional liquid crystal display element of the TN mode, therefore driving of the liquid crystal display element to indicate gray scale is very easy.

It is to be noted that desirably the transmittance of the liquid crystal display element which employs the liquid crystal polymer composite is as high as possible in transmitting condition, and preferably the haze value in a scattering condition is higher than 80%.

According to the present invention, when a voltage is applied across the liquid crystal display element, the refractive index of the polymer matrix (after it has been cured) coincides with the ordinary refractive index ($n_o$) of the liquid crystal used.

Consequently, when the refractive index of the resin matrix and the refractive index of the liquid crystal coincide with each other, light is transmitted through the liquid crystal display element, but when they do not coincide with each other, light will be scattered (the liquid crystal display element will become slightly opaque). The light scattering property of the element is higher than a conventional liquid crystal display element in the DS mode (Dynamic Scattering Mode), and a display of a high contrast ratio can be attained.

The object of the present invention is the provision of an optimum construction for a projection type active matrix liquid crystal display device which employs an active matrix liquid crystal display element in which a liquid crystal polymer composite is held.

In particular, the present invention provides a projection type active matrix liquid crystal display device which has a high transmittance in a transmitting condition but has a high diffusing property (light interrupting property) in a scattering condition and is bright, good in color balance and high in contrast ratio.

Further, where a p-Si-TFT is employed, even if light is received from an intense projection light source, the TFT will not react to the light so that the projection type active matrix liquid crystal display device will seldom make a display in error, and a brighter projection type display is enabled.

Also an electrode substrate distance $d_G$ of a liquid crystal display element with respect to a light source is an important factor. If $d_G$ is increased, then the light scattering property of the liquid crystal display element when no electric field is applied is improved. However, if $d_G$ is excessively high, then a high voltage is required in order to attain a sufficient transparency when an electric field is applied, which arises such problems that power consumption increases and that a conventional active element for the TN mode or conventional driving integrated circuit cannot be used. On the contrary, if $d_G$ is decreased, then a high transparency can be obtained with a low voltage, but the light scattering property when no electric field is applied decreases. Accordingly, the condition of the equation (2A) given hereinabove should be satisfied in order to meet the light scattering property when no electric field is applied and the high transparency when an electric field is applied.

On the other hand, in the case of a white and black display, the conditions of the equations (1B) and (2B) are adopted, and since the wavelength of green substantially falls on the center of the visible radiation region, it is best to satisfy the equations (1B) and (2B).

Further, in order to match characteristics for individual colors, $R_x/\lambda_x$ is substantially made equal to $R_G/\lambda_G$ and $d_x/\lambda_x$ is substantially made equal to $d_x/\lambda_x$ at all of liquid crystal display elements. Particularly, the following relationships are satisfied.

$$\frac{0.9 R_G}{\lambda_G} < \frac{R_X}{\lambda_X} < \frac{1.1 R_G}{\lambda_G} \tag{4B}$$

$$\frac{0.9 d_G}{\lambda_G} < \frac{d_X}{\lambda_X} < \frac{1.1 d_G}{\lambda_G} \tag{5B}$$

The equation (4B) is provided to optimize the light scattering property and make average phase shifts of incident light by the liquid crystals substantially equal to each other for the individual colors.

The equation (5B) is provided to make the relationships between an applied voltage and a light scattering property and the voltage-transmittance characteristics substantially coincide with each other for the individual colors.

Accordingly, where such conditions described are satisfied at a time, a projection type liquid crystal display device can be obtained which is high in brightness and contrast ratio, good in color balance with uniform voltage-transmission characteristic.

An optimized condition is reached if $R_x/\lambda_x$ and $d_x/\lambda_x$ of each of a plurality of liquid crystal display elements are made coincide with $R_G/\lambda_G$ and $d_G/\lambda_G$, respectively.

Accordingly, where three colored light sources of red, green and blue are used, $R_x/\lambda_x$ and $d_x/\lambda_x$ of each of the three liquid crystal display elements are made substantially coincide with $R_G/\lambda_G$ and $d_G/\lambda_G$, respectively. In particular, the following conditions are satisfied.

$$\frac{R_R}{\lambda_R} \approx \frac{R_G}{\lambda_G} \approx \frac{R_B}{\lambda_B} \tag{6B}$$

$$\frac{d_R}{\lambda_R} \approx \frac{d_G}{\lambda_G} \approx \frac{d_B}{\lambda_B} \tag{7B}$$

In the present invention, it is preferable to optimize $R_x/\lambda_x$ and $d_x/\lambda_x$ for each color as described above. Further, while the contrast ratio is a little deteriorated and the allowable range is decreased, $d_x$ and $\lambda_x$ can be optimized in the following manner with the average particle diameters R of liquid crystals held fixed. In this instance, since the average particle diameter R of liquid crystals need not be varied even for a display in a plurality of colors, production of a liquid crystal display device is easy. Further, where the liquid crystal display device is used together with color filters, a display in a plurality of colors can be made with the single liquid crystal display element. Accordingly, in order to match the characteristics for the individual colors, $d_x/\lambda_x$ is substantially made equal to $d_G/\lambda_G$ at all of liquid crystal display elements or at the color filters of the liquid crystal display elements. Particularly, the following conditions are satisfied.

$$0.3 < R \cdot \Delta n < 0.7 \tag{1B}$$

$$4 R < d_G < 8 R \tag{2B}$$

$$\frac{0.95 d_G}{\sqrt{\lambda_G}} < \frac{d_X}{\sqrt{\lambda_X}} < \frac{1.05 d_G}{\sqrt{\lambda_G}} \tag{5C}$$

The equation (5C) is provided to optimize the light scattering properties by the liquid crystal and make the voltage-transmittance characteristics coincide with each other for the individual colors.

Accordingly, where those conditions are satisfied simultaneously, a display device, particularly a projection type liquid crystal display device, can be obtained which is high in brightness and contrast ratio, good in color balance with uniform voltage-transmission characteristic.

An optimized condition is reached if $d_x/\sqrt{\lambda_x}$ of each of a plurality of liquid crystal display elements or a liquid crystal display element with color filters is made coincide with $d_x/\sqrt{\lambda_x}$, respectively.

Accordingly, where three colored light sources or color filters of red, green and blue are used, the relationships $d_x$ and $\lambda_x$ of the individual three liquid crystal display elements or the liquid crystal display element with color filters are made substantially coincide with each other. In particular, the following condition is satisfied.

$$\frac{d_R}{\sqrt{\lambda_R}} \approx \frac{d_G}{\sqrt{\lambda_G}} \approx \frac{d_B}{\sqrt{\lambda_B}} \qquad (7B)$$

For example, where $d_G=10\,\mu m$, if $d_R\approx 11\,\mu m$ and $d_B\approx 9\,\mu m$, then a display which is good in color balance can be obtained while the average particle diameter R of the liquid crystals is maintained fixed.

In the case of three liquid crystal display elements of three colors, the liquid crystal display elements may be produced with the electrode distances individually set in accordance with the conditions described hereinabove, but in the case of a liquid crystal display element with color filters, the electrode distances of picture elements for the individual colors of the color filters may be varied in accordance with the conditions given hereinabove.

Consequently, a display which is good in color balance and high in contrast ratio can be obtained even if a drive voltage or the like is not adjusted for each color on the driving circuit side.

The absolute value of an electrode substrate distance $d_x$ should be selected in accordance with an applied voltage used such that the display brightness and the contrast ratio may be optimum. When a square wave ranging from 0 to $V_{MAX}$ is applied, the root mean square of applied voltage is equal to the applied voltage, and accordingly, it is preferable to adopt the following range similarly to the equation (3) given hereinabove.

$$0.5\,R_G\cdot V_{MAX} < d_G < R_G\cdot V_{MAX} \qquad (3C)$$

Particularly, it is preferable for $d_G$ to be smaller than $0.8 R_G\cdot V_{MAX}$. Where a TFT is used as in an ordinary active matrix liquid crystal display device of the TN type preferably the root mean square of applied voltage is lower than 10 V. For example, in the case of $V_{MAX}=8$ V, $d_G$ should be substantially 8 to 13 $\mu m$ or so.

Liquid crystal used must necessarily have an anisotropy of refractive index $\Delta n$ greater than 0.18. Above all, a value greater than 0.20 is preferable, and particularly a value greater than 0.23 is preferable.

While the color balance by a plurality of liquid crystal display elements can be improved to some degree even by modulation of a driving signal, it is difficult to improve the color balance only by modulation of a driving signal on the lower voltage side by a gray scale or when no electric field is applied.

A significant feature of the present invention resides in that voltage-transmittance characteristics for individual colors can be matched with each other, that is, a display which is good in color balance can be obtained, without relying much upon modulation of a driving signal.

Where a plurality of active matrix liquid crystal display elements each employing a liquid crystal polymer composite which presents a transparent condition when a voltage is applied but presents a scattering condition when no voltage is applied are used and conditioned such that the conditions of the equations (1A), (2A), (4B) and (5B) given hereinabove may be all satisfied for individual colored light sources therefor, a display which is good in color balance and high in contrast ratio and in brightness can be made using conventional active elements and/or driving integrated circuits of the TN. Particularly, such a display is possible wherein the contrast ratio is greater than 100 and the transmittance when an electric voltage is applied is higher than 70%. Further, since the dynamic range is wide, an element can be obtained wherein a fine gray scale display is possible. Further, where the conditions of the equations (1B), (2B) and (5C) are all satisfied instead of the conditions given above, such a display wherein the contrast ratio is high and the transmittance when an electric field is applied is higher than 70% although it is inferior to that of the range described above.

It is to be noted that, in the case of a white and black display, where liquid crystal display elements satisfy all of the conditions of the equations (1B) and (2B), a bright display having a similarly high contrast ratio can be made.

Further, in order to improve the light scattering property when no electric field is applied, it is effective to increase the volume fraction $\Phi$ of liquid crystal which can operate in a liquid crystal polymer composite, and $\Phi>20\%$ is preferable, particularly $\Phi>35\%$ is preferable for the liquid crystal display element to have a higher diffusing property. However, if $\Phi$ becomes excessively high, the structural stability of a liquid crystal polymer composite is deteriorated, and accordingly, $\Phi<70\%$ is preferable.

A liquid crystal display element of the present invention presents, when no electric field is applied, a scattering condition (in short, an opaque condition) due to a difference in refractive index between the liquid crystal not in an oriented condition and a polymer matrix. Accordingly, where the liquid crystal display element is used with a projection type display device as in the present invention, light is scattered by a portion of the liquid crystal display element at which no electrode exists, and even if a light shielding layer is not provided at any portion than pixel, no light comes to a screen from that portion so that portion of the screen looks dark. Consequently, it is not necessary to provide a light shielding layer around the pixel electrodes in order to prevent leak of light from any other portion of the liquid crystal display element than the pixel electrodes. Accordingly, also there is an advantage that the step of forming a light shielding layer is unnecessary.

A desired electric field is applied to the liquid crystal display element. At portions of the liquid crystal display element to which the electric field is applied, the liquid crystal is oriented so that the ordinary refractive index ($n_o$) of the liquid crystal and the refractive index ($n_p$) of the polymer matrix coincide with each other. Consequently, the liquid crystal display element presents, at the portions thereof, a transmitting condition, and accordingly, light is transmitted through the desired pixel to make a bright display thereof on a screen.

Preferred embodiments of the liquid crystal display element and the projection type liquid crystal display apparatus of the present invention will be described with reference to the drawings.

FIG. 1 is a cross-sectional view showing an embodiment of the liquid crystal display element of the present invention.

In FIG. 1, reference numeral 1 designates a liquid crystal display element, numeral 2 designates a substrate such as glass, plastics or the like which is used as an active matrix substrate, numeral 3 designates a picture element electrode such as ITO ($In_2O_3$—$SnO_2$), $SnO_2$ or the like, numeral 4 designates an active element such as a transistor, a diode, a non-linear resistance element or the like, numeral 5 designates a substrate such as glass, plastics or the like which is used as a counter electrode substrate, numeral 6 designates a counter electrode such as ITO, $SnO_2$ or the like, and numeral 7 designates a liquid crystal and solidified matrix composite material interposed between the substrates.

Figure 2:
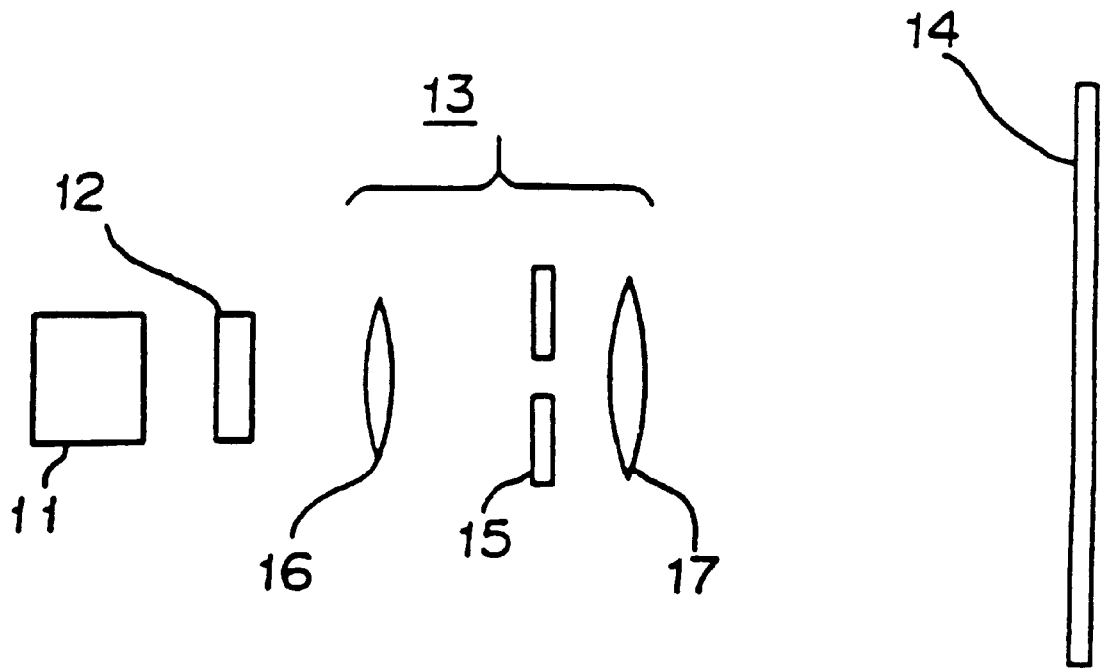
FIG. 2 is a diagram showing the basic construction of an embodiment of a projection type liquid crystal display apparatus according to the present invention in which the liquid crystal display element is used.

FIG. 2 is a diagram showing an embodiment of the projection type liquid crystal display apparatus in which the liquid display element of the present invention is used.

In FIG. 2, reference numeral 11 designates a projection light source, numeral 12 designates a liquid crystal display element, numeral 13 designates a projection optical system including elements such as a lens, an aperture and so on, and numeral 14 designates a projection screen. In this embodiment, the projection optical system includes an aperture means or spot 15 constituted by a perforated plate, a focusing lens 16 and a projection lens 17.

Figure 3:
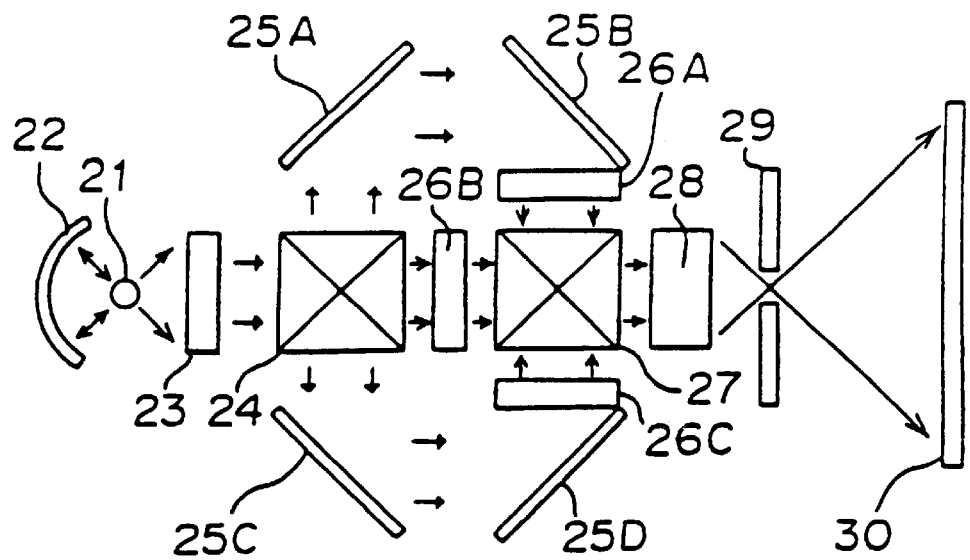
FIG. 3 is a diagram showing an embodiment of the full-color projection type liquid crystal display apparatus of the present invention in which dichloric prisms are used.

FIG. 3 is a diagram showing an embodiment of the full-color projection type liquid crystal display apparatus in which dichroic prisms are used, in accordance with the present invention.

In FIG. 3, reference numeral 21 designates a light source, numeral 22 designates a concave mirror, numeral 23 designates a condenser lens, numeral 24 designates a color splitting dichroic prism, numerals 25A, 25B, 25C, 25D designate mirrors, the elements 21 through 25D constituting a color light source, numerals 26A, 26B, 26C designate liquid crystal elements each having a liquid crystal and solidified matrix composite material corresponding to each color, numeral 27 designates a synthesizing dichroic prism, numeral 28 designates a projection lens, numeral 29 designates an aperture for removing light other than straight-forward light and numeral 30 designates a projection screen, the elements 27 through 29 constituting a projection optical system.

In the embodiment shown in FIG. 3, adjustment can be easy because there are provided only one aperture to remove diffusion light other than the straight-forward light and a single optical axis, and the distance to the projection screen can be changed.

Figure 4:
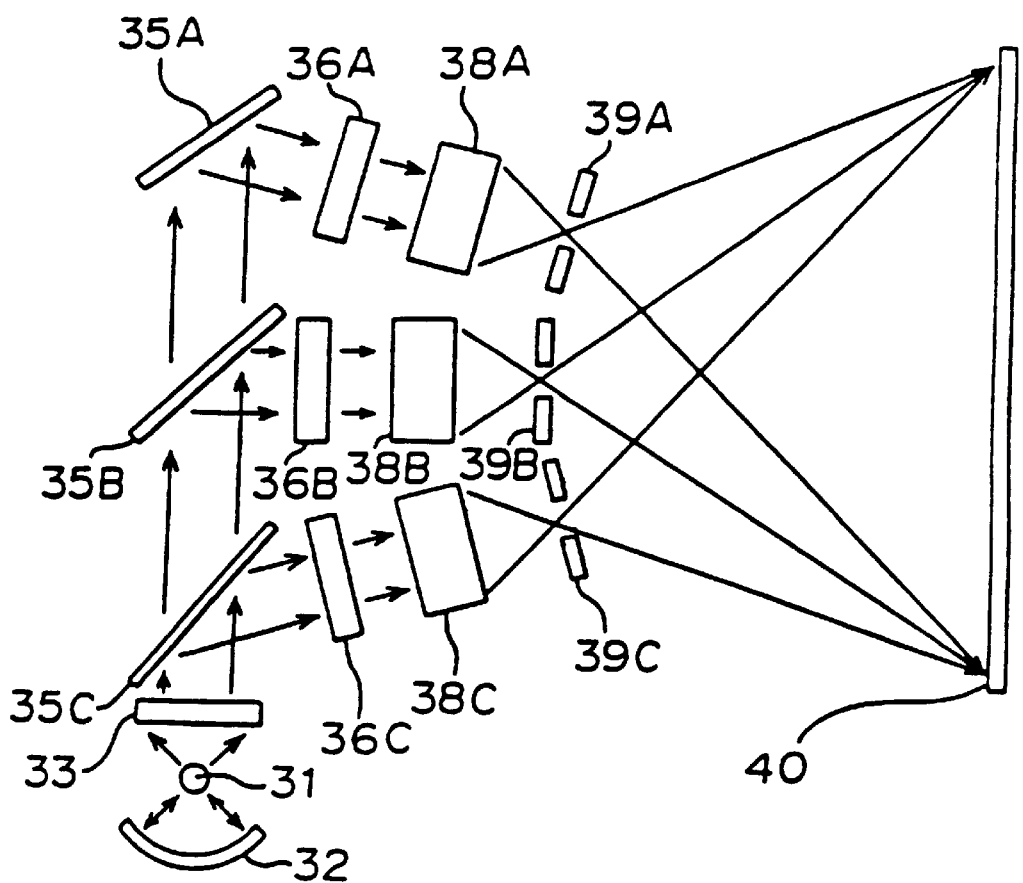
FIG. 4 is a diagram showing an embodiment of the full-color projection type liquid crystal display apparatus of the present invention in which no dichloric prism is used.
Figure 4:
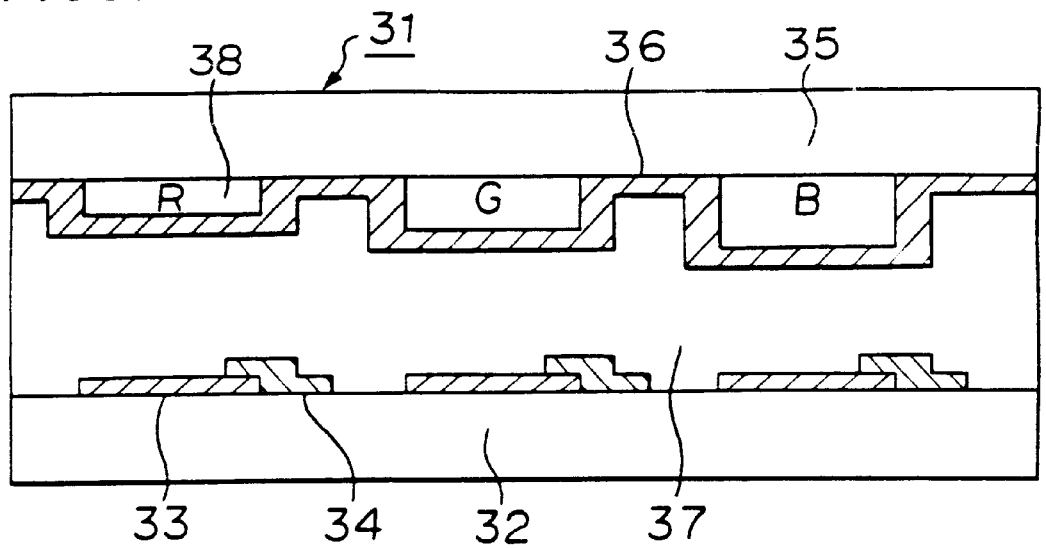

FIG. 4 is a diagram showing an embodiment of the full-color projection type liquid crystal display apparatus of the present invention wherein no dichroic prism is used.

In FIG. 4, reference numeral 31 designates a light source, numeral 32 designates a concave mirror, numeral 33 designates a condenser lens, numerals 35A, 35B, 35C designate dichroic mirrors, the elements 31 through 35C constituting a color light source, numerals 36A, 36B, 36C designate liquid crystal display elements each having a liquid crystal and solidified matrix composite material corresponding to each color, numerals 38A, 38B, 38C designate projection lenses provided for each color, numerals 39A, 39B, 39C designate apertures for removing light other than straight-forward light which are respectively provided for different colors, and numeral 40 designates a projection screen, the elements 38A–39C constituting a projection optical system.

Referring to FIG. 4', there is shown in section another active matrix liquid crystal display element with color filters for use with a projection type active matrix liquid crystal display device of the present invention. The active matrix liquid crystal display element is generally denoted at 31 and includes a substrate 32 serving as an active matrix substrate, pixel electrodes 33, active elements 34, another substrate 35 serving as a counter electrode substrate, a counter electrode 36, a liquid crystal polymer composite 37, and color filters 38 interposed between the counter electrode 36 and the substrate 35. The distances between the pixel electrodes 33 and the counter electrode 36 are differentiated for different pixel depending upon dominant wavelengths of the color filters 38.

In a case of using a three-terminal element such as TFT (thin film transistor) as the active element in accordance with the present invention, a solid electrode (entire surface) in common with all picture elements may be disposed for the counter electrode substrate. In the case of using a two-terminal element such as an MIM element or a PIN diode, however, the counter electrode substrate is applied with a stripe-like patterning.

In the case of using TFT as the active element, silicon is suitable as the semiconductor material. Polycrystalline silicon is particularly preferred since it has less photosensitivity as in amorphous silicon and, accordingly, does not cause erroneous operation even without shielding light from a light source by means of a light shielding film, or with a thin light shielding layer to the active element. In the case of using polycrystalline silicon for the projection type liquid crystal display apparatus in the present invention, a strong light source for projection can be utilized and a bright display is obtainable.

In the case of the conventional TN type liquid crystal display element, a light shielding film is often formed between picture elements so as to suppress the leakage of light from the portion between the picture elements, and a light shielding film can be formed to the active element at the same time of forming the light shielding film between the picture elements. Accordingly, formation of the light shielding film to the active element gives no substantial effect on the entire steps. Namely, if the polycrystalline silicon is used for the active element and the light shielding film is not formed to the active element portion, the number of steps can be decreased if it is required to form the light shielding film at the portion between the picture elements.

On the contrary, in the present invention, the liquid crystal and solidified matrix composite material wherein the refractive index of the solidified matrix substantially agrees with the ordinary refractive index ($n_o$) of the liquid crystal used, is used as described before. Accordingly, light is scattered at the portion not applied with the electric field, and it appears dark on the projection screen. Accordingly, there is no requirement for forming the light shielding film in the portion between the picture elements. Therefore, in the case of using the polycrystalline silicon as the active element, there is no requirement for forming the light shielding film at the active element portion, and accordingly, the step of forming the light shielding film can be eliminated or severe requirements to the light shielding film can be reduced, whereby the number of manufacturing steps can be reduced and the productivity is improved.

Even in the case of using the amorphous silicon, if the light shielding film is formed at the semiconductor portion, the liquid crystal display element of the present invention can be used.

Further, the electrodes used are usually transparent electrodes. In the case of using the electrodes for a reflection type liquid crystal display apparatus, however, a reflection electrode made of a material such as Cr, Al or the like may be used.

In the liquid crystal display element and the liquid crystal display apparatus according to the present invention, an infrared ray cut filter or UV-ray cut filter or the like may be used in a lamination form, or characters, figures or the like may be printed, or a plurality of liquid crystal display element may be used.

Further, in the present invention, a protective plate such as glass plate, a plastic plate or the like may be overlaid on or at the outside of the liquid crystal display element. The protective plate reduces a danger of the breakage of the display element when the surface of the element is pushed, whereby the safety of the display element is improved.

When the photo-curable compound is used for the liquid crystal and solidified matrix composite material, it is preferable to uniformly dissolve the photo-curable compound in the liquid crystal. The cured material after exposure to light can not be dissolved or is hardly dissolved. When the above-mentioned composition is used, it is desirable to use the liquid crystal having a closer value in solubility.

The liquid crystal and solidified matrix composite material is prepared as follows. For instance, a pair of substrates are arranged, and the surfaces with electrodes of the substrates are opposed; the circumferential portions of the two substrates opposed are sealed with a sealing material; a mixed solution of an uncured mixture of liquid crystal and curable compound is injected through an injection port followed by sealing the injection port in the same manner as the conventional preparation of the liquid crystal display element. Or a mixture of curable compound and liquid crystal is supplied to one of the substrates, followed by overlaying the other so as to oppose to each other.

For the liquid crystal display element of the present invention, dichroic dye, dye or pigment may be added to the liquid crystal, or a colored material may be used as a curable compound.

In the present invention, when the liquid crystal in the liquid crystal and solidified matrix composite material is utilized as the solvent, and the photocurable compound is cured by the exposure to light, it is unnecessary to evaporate solvent or water which is needless at the curing time. Accordingly, in this case, the conventional method of preparation of the injection of liquid crystal to the cell can be employed because the curable compound is cured in an enclosed system. The curing of the curable compound in the enclosed system provides high reliability. This can be further assured by the effect obtained by bonding the two substrates with the photo-curable compound.

In the present invention, since the liquid crystal and solidified matrix composite material is used, a possibility that the upper and lower transparent electrodes may short-circuit can be reduced, and it is unnecessary to strictly control the orientation of the liquid crystal and the substrate gap as required for the conventional TN type display element. Accordingly, the liquid crystal display element capable of controlling a transparent state and a scattering state can be effectively produced.

The projection light source, the projection optical system, the projection screen and so on used in the present invention may be a conventionally used light source, projection optical system, projection screen and so on. It is enough that the liquid crystal display element is disposed between the projection light source and the projection optical system. The projection optical system may be used so that images from the plurality of the liquid crystal display elements are synthesized with use of an optical system and the synthesized image is displayed.

As the light source used for the projection light source, there are a halogen lamp, a metal halide lamp, a xenon lamp and so on. Further, a concave mirror, a condenser lens or the like may be combined with the lamp to increase utilization of light.

In addition to the lamp or the combination of the lamp and the mirror or lens, a cooling system may be added, or a TV channel display devise such as LED or the like may be added.

In particular, in the case of using the projection type display, a device for reducing diffusion light, e.g. an aperture or a spot as indicated by numeral 15 in FIG. 2 may be disposed on the optical path so that the contrast ratio of display can be increased. Namely, as the device for reducing diffusion light, it is preferred to use such a device that among incident light passing through the liquid crystal display element, straightforward light (light which has transmitted portions in which the picture element portions are in a transparent state) is taken, and non-straight-forward light (light scattered at portions in which the liquid crystal and solidified matrix composite material is in a scattering state) is diminished. Such diffusion light reducing device is preferred because the contrast ratio can be improved. In particular, the device which does not reduce the straight-forward light but reduces diffusion light (the non-straight-forward light), is preferred.

FIG. 2 shows a concrete example of the device for reducing diffusion light. The device is constituted by a liquid crystal display element and a projection optical system, specifically, a liquid crystal display element 12, a focussing lens 16, an aperture or a spot 10 which may be a perforated plate and a projection lens 17.

In operation of the device shown in FIG. 2, light emitted from the projection light source passes through the liquid crystal display element 12. Among the light passing through the display element 12, straight-forward light in incident light is collected by the focussing lens 16; the collected light is passed through the aperture or the spot 15 and is projected on the projection screen through the projection lens 17. On the other hand, light which is not straight forward and scatters at the liquid crystal display element 12 does not pass through the aperture or spot 15 even though it is collected by the focussing lens 16. Accordingly, scattered light is not projected, and the contrast ratio can be improved.

As another embodiment, a mirror having a small surface area is arranged obliquely at the same position, instead of the aperture or the spot 15. Light reflected by the mirror is projected through a projection lens disposed on the optical axis of the mirror. Further, a spot or mirror or the like may be disposed at a position where light beams are focused by a projection lens, without using the focussing lens.

The focal length or the diameter of a projecting lens may be suitably selected so as to remove scattering light, without using a specially arranged aperture.

Further, a microlens system can be used. Specifically, a combination of a microlens array and a spot array in which fine holes are formed in array may be disposed at the side of the projection optical system with respect to the liquid crystal display element to thereby remove needless scattering light. This arrangement has an advantage of reducing the entire size of the projection type display apparatus because the optical path length necessary for removing scattering light can be remarkably shortened. In order to reduce the optical path length, the installation of the scattering light removing system in the projection optical system is effective way. The structure of projection type display apparatus in which the scattering light removing system is installed in the projection optical system is simpler than the structure in which the projection optical system and the scattering light removing system are independently disposed, whereby the entire size of the apparatus can be reduced.

These systems may be used in combination with a mirror, a dichroic mirror, a prism, a dichroic prism, a lens and so on to synthesize a picture image and to display a colored image. Further, a colored picture image is obtainable by combining the optical system with a color filter.

The ratio of the scattered light component and the straight-forward light component reaching on the projection screen can be controlled by adjusting the diameter of the spot or the mirror and the focal length of the lens, so that a desired contrast ratio of display and the brightness in display can be obtained.

When the device for reducing diffusion light as shown in FIG. 2 is used, light entering from the projection light source to the liquid crystal display element should be parallel in order to increase the brightness of display. For this, it is preferable to constitute a projection light source by combining a light source capable of providing high brightness (which should be a point light source), a concave mirror, a condenser lens and so on.

Description has been made mainly as to the projection type display apparatus having a transmission type structure. However, the present invention is applicable to a projection type display apparatus having a reflection type structure wherein a small mirror is disposed, instead of a spot, to take out only necessary light.

Although the display element according to the present invention has excellent characteristics as an active matrix liquid crystal display element for a half-tone display, it effectively operates in another-non-active driving system (a static-driving system or a multiplex driving system). In particular, it is remarkably advantageous with respect to the multiplex-driving in comparison with the conventional display element. The multiplex-driving system is a driving system in which driving is conducted on the basis of a difference of voltage between an OFF voltage and an ON voltage. In the liquid crystal and solidified matrix composite material, sharpness in the voltage-transmittance characteristics and the presence or absence of the hysteresis greatly influence on the optical characteristics in the multiplex-driving. If the voltage-transmittance characteristics have a sharp threshold value characteristic, the display element is suitable for the multiplex-driving. Since the voltage-transmittance characteristics have a sharp threshold characteristics, the number of lines for simultaneous driving can be increased, it is possible to achieve a display having a higher density. However, when there is a large hysteresis, there appears a difference in the transmittance between a voltage-increasing time and a voltage-decreasing time to thereby invite reduction of contrast ratio and uneven display at the time of multiplex-driving.

In the present invention, the sharp threshold value characteristic and the low hysteresis characteristic can be simultaneously achieved, and accordingly, it is possible to obtain a display having excellent contrast and uniformity which has not been provided in the conventional technique, in the multiplex-driving.

Regarding to the reduction of the hysteresis, there are other techniques such that a strain is applied to the shape of the liquid crystal particles dispersed and modulation is applied to a driving waveform. However, the hysteresis of the display element of the present invention can be reduced with little energy loss, i.e. without increasing the driving voltage. Therefore, it is advantageous in comparison with another technique. The technique of the present invention can be combined with another technique to obtain a synergistic effect in consideration of a liquid crystal used, a matrix material, a driving voltage, a response characteristic and so on.

In accordance with the present invention, a display having a high contrast ratio is obtainable. When the present invention is used for a projection type display, light is passed through a transparent state portion in a transparent-scattering type liquid crystal display elements; a projection screen is brightly displayed; light is scattered at a scattering state portion whereby the projection screen is displayed dark. Thus, a display having a desired brightness and a high contrast ratio can be obtained.

In the present invention having the construction described above, the hysteresis is reduced and image-sticking is reduced. Accordingly, a clear half-tone display is possible, and a dynamic display having a fine gradation can be easily obtained with use of an active element and a driving IC which have been used for the conventional TN active matrix liquid crystal display element.

If it is intended to use the liquid crystal display element with color filters to make projection with a single liquid crystal display element, then light from a single projecting light source should be introduced into the liquid crystal display element such that energized light from the liquid crystal display element may be projected on the projection screen by means of the optical system of projection.

Where a three-terminal element such as a thin film transistor (TFT) is used as an active element of an active matrix liquid crystal display element according to the present invention, the counter electrode substrate may be formed as a universal common electrode to all pixels, but where a two-terminal element such as a MIM element or a PIN diode is used, the counter electrode substrate is patterned into stripes.

Meanwhile, where a thin film transistor is used as an active element, silicon is preferably used as a semiconductor material. Particularly since polysilicon has little photosensitivity as distinct from amorphous silicon, it is preferable because it will not cause operation in error even if light from a light source is not interrupted by means of a light shielding layer. Where such polysilicon is used for a projection type liquid crystal display device as in the present embodiment, an intense projecting light source can be utilized and a bright display can be obtained.

On the other hand, in the case of a conventional liquid crystal display element of the TN type, a light shielding-layer is formed in most cases between each adjacent pixels in order to prevent leakage of light from between the pixels. Upon formation of such light shielding layers, light shielding layers can be formed simultaneously at locations of active elements, and accordingly, formation of light shielding layers at locations of active elements does not have a great influence on the entire process. In other words, even if polysilicon is used for active elements and light shielding layers are not formed at locations of the active elements, if there is the necessity of formation of light shielding layers between pixels, no step can be eliminated.

However, according to the present invention, since a liquid crystal polymer composite is used wherein the refractive index of a polymer matrix substantially coincides with the ordinary refractive index ($n_o$) of liquid crystal used as described above, light will be scattered at a location of the liquid crystal display element to which no electric field is applied so that a dark area will be formed at a corresponding location of a projection screen. Accordingly, no light shielding layer need be formed between adjacent pixels. Thus, since no light shielding layer need be formed at locations of active elements where polysilicon is used for such active elements, a step of forming a light shielding layer can be eliminated, and the number of steps can be reduced and the productivity is improved.

Further, while the electrodes are normally formed as transparent electrodes, where the liquid crystal display device is used as of the reflection type, the electrodes may be reflective electrodes made of chrome, nickel or the like.

A liquid crystal display element and a liquid crystal display device of the present invention may be further provided with an infrared ray cut filter, an ultraviolet ray cut filter or the like layered thereon or with a print of characters, figures or the like or may include a plurality of liquid crystal display elements.

Liquid crystal which is used in the present embodiment is nematic liquid crystal which has a positive dielectric anisotropy and wherein the refractive index of a polymer matrix coincides with the ordinary refractive index ($n_o$) of the liquid crystal. While liquid crystal may be used alone or a mixture may be used, it is advantageous to use a mixture in order to meet various required performances such as an operating temperature range and an operating voltage.

Further, where a light curable polymer is used, liquid crystal used for a liquid crystal polymer composite preferably contains light curable polymer dissolved uniformly therein, and cured substance after exposure to light will not or little be dissolved. However, where a compositions used, liquid crystals of individual components desirably have solubilities as close as possible to each other.

A liquid crystal polymer composite may be produced in the following manner. In particular, non-cured mixture liquid for a liquid crystal polymer composite is filled by way of a filling port into a spacing between an active matrix substrate and a counter electrode substrate which are disposed such that electrodes thereon may oppose to each other as in a conventional ordinary liquid crystal display element, and the circumference of the spacing is sealed with a seal material whereafter the filling port is closed or else, mixture of a curable compound and liquid crystal may be supplied onto a substrate whereafter a counter substrate is placed on the mixture on the substrate.

A liquid crystal display element of the present invention may be composed of liquid crystal to which a dichroic compound or a coloring material or pigment is added or else composed of liquid crystal in which a colored curable compound is contained.

According to the present invention, as a liquid crystal polymer composite employs liquid crystal as a solvent and a light curable polymer is caused to cure by exposure thereof to light, there is no necessity of evaporation of mere solvent or water which becomes unnecessary upon curing. Consequently, the light curable resin can be cured in an enclosed system, and accordingly, a conventional process of production of filling liquid crystal into a cell can be adopted as it is and the reliability is high. Besides, since there is an effect that two substrates are adhered to each other by means of such light curable polymer, the reliability is further improved.

As a liquid crystal polymer composite is employed in this manner, a liquid crystal-display element wherein the possibility that upper and lower transparent electrodes may be short-circuited is reduced and a transmission condition and a scattering condition can be controlled without the necessity of strictly controlling an orientation or a substrate distance as in an ordinary display element of the TN type can be produced with a very high productivity.

A liquid crystal display device of the present invention should be driven such that, when a voltage is to be applied for driving thereof, a voltage lower than the maximum root means square of applied voltage provided by the expression (3B) or (3C) given hereinabove, normally such maximum root mean square of applied voltage, may be applied to the liquid crystal polymer composite between electrodes of a pixel.

A conventional light source, optical system of projection and projection screen can be used as the light source, optical system of projection and projection screen, respectively, in the present invention, and an active matrix liquid crystal display element of the present invention should be interposed between a colored light source and the optical system of projection. In this instance, the optical system of projection may be constituted such that images of a plurality of active matrix liquid crystal display elements are combined for projection thereof by means of an optical system as shown in FIG. 3 or else images of a plurality of active matrix liquid crystal display elements are projected on a projection screen so as to combine them on the projection screen as shown in FIG. 4.

Further, while colored light sources are also obtained by color separation of light from a single light source in the example described hereinabove, otherwise a plurality of colored light sources may be individually provided in advance so that rays of light therefrom may be individually introduced into active matrix liquid crystal display elements.

The light source which may be used as such colored light source may be a halogen lamp, a metal halide lamp, a xenon lamp or the like, and a concave mirror, a condenser lens or the like may be combined to use light efficiently.

Further, a cooling system may be added, or an infrared ray cut filter or an ultraviolet ray cut filter may be used in combination, or else a channel display or the like such as a light emitting diode or the like may be additionally provided.

Particularly where a display of the projection type is made, the display contrast can be increased by disposing on a passage of light a device for reducing diffused light such as, for example, the aperture or spot member as represented by 29,39A, 39B, or 39C, in FIG. 3 or 4.

In particular, in order to improve the contrast ratio, it is preferable to employ, as a device for reducing diffused light, a device which takes out, from among beams of light which have passed through a liquid display element, those beams of light which advances rectilinearly with respect to incident beams of light (beams of light which have passed through pixel portions in a transmitting condition) but reduce beams of light which do not advance rectilinearly (light diffused at portions of a liquid crystal polymer composite which are in a scattering condition).

It is particularly preferable for the device not to reduce light which advances rectilinearly but to reduce diffused light which does not advance rectilinearly. More particularly, a plate having an opening formed at a central portion thereof may be disposed at a location to which light is condensed by a lens or the like. Thus, light which advances rectilinearly passes through the opening of the plate and is not reduced by the plate, but diffused light which does not advance rectilinearly comes at a portion of the plate around the opening and does not reach a projection screen. Consequently, the contrast of an image projected is improved.

Such a device for reducing diffused light may be interposed between an optical system of projection and a projection screen as shown in FIG. 3 or 4 or may be interposed in an optical system of projection, for example, where an optical system of projection is composed of a plurality of lenses, between two adjacent ones of the lenses of the optical system of projection.

The device for reducing diffused light is not limited to such an aperture or spot member as described hereinabove, but may be, for example, a mirror of a small area disposed on a passage of light.

The ratio between a rectilinearly advancing light component which reaches a projection screen and a scattered light component can be controlled in accordance with the diameter of a spot or a mirror and the focal length of a lens and may be set to a suitable value so that a desired display contrast and display brightness may be obtained.

Such device for reducing diffused light transmits light of $\delta < \delta_o$ therethrough and interrupts light of $\delta > \delta_o$ where $\delta$ is a scattering angle of light with respect to rectilinearly advancing light. As the angle $\delta_o$ is reduced, the diffused light is reduced and the contrast ratio is increased, but there is the tendency that the brightness is decreased. On the contrary, as the angle $\delta_o$ is increased, the brightness is increased, but the contrast ratio is decreased. Therefore, $\delta_o$ should preferably be 0.02 to 5 degrees or so, and particularly preferably be 0.5 to 3 degrees.

A projection type active matrix liquid crystal display device of the present invention may be constructed as the front projection type (wherein the device and an observer are positioned on the same side with respect to a projection screen) or else as the rear projection type (wherein the device and an observer are positioned on the opposite sides with respect to a projection screen).

Thus, according to the present invention, a projection type display which is good in color balance, high in display brightness and high in contrast ratio can be attained.

Particularly, according to the present invention, since such an active matrix liquid crystal display element wherein a liquid crystal polymer composite of a specific characteristic corresponding to a color of a light source as described above is employed a good color balance and gray scale can be attained without incorporating a special correcting circuit in a drive circuit. Further, the maximum root mean square of applied voltage can be decreased to a voltage lower than 10 volts, and accordingly, such active elements or driving integrated circuits as used in a conventional active matrix liquid crystal display element of the TN type can be used readily.

In the following, the present invention will be described more in detail in connection with various examples.

EXAMPLE 1

A nematic liquid crystal of a positive dielectric anisotropy having 10.5 of dielectric anisotropy $\Delta\epsilon_{LC}$, 0.24 of refractive index anisotropy $\Delta n$, $12 \times 10^{-12}$ N of elastic constant K11, $15 \times 10^{-12}$ N of K33, and about 35 cSt of viscosity $\eta$, acrylate monomer, urethane acrylate oligomer, and a photo-cure initiator were uniformly dissolved to prepare an uncured mixture.

An active matrix substrate having polycrystal silicon TFT for each picture element and a counter electrode substrate on which a solid electrode (entire surface) is formed were sealed at their peripheral portions with use of a sealing material to thereby prepare a cell having an electrode substrate gap of 13 $\mu$m.

The uncured mixture was injected to the cell, and it was exposed to UV-rays to cure the mixture to thereby form a liquid crystal and solidified matrix composite material. The driving voltage of the liquid crystal display element was about 7V.

When the dielectric constant $\epsilon_M$ was measured by the application of a voltage (0.3V) which is lower than the threshold value voltage, it was found that the dielectric constant was about 8.7 in terms of 1 kHz. When the liquid crystal display element was driven with a video signal, a dynamic display having an excellent half-tone display was obtained. There was found no image-sticking (residual image remaining over several seconds or more) at the time of changing a picture image.

The liquid crystal display element was combined with a light source system and a projection optical system to prepare a projection type display apparatus. When a picture image was projected on the screen, a very bright dynamic picture image (video image) having an excellent half-tone display could be obtained. Measurement of the contrast ratio on the screen resulted about 150:1. The correction cone angle (which is determined by $2 \tan^{-1} (\Phi/2f)$, in which $\Phi$ is the diameter of the aperture (spot) and f is the focal length of the lens) of the projection optical system was about 5° in total angle.

EXAMPLES 2 TO 5 AND COMPARATIVE EXAMPLES 1 TO 4

Liquid crystal display elements were prepared in the same manner as in Example 1 except that in the liquid crystal used, dielectric anisotropy and the refractive index anisotropy were changed. The electrode substrate gap was adjusted for each liquid crystal display element in order to make the driving voltage uniform.

The driving voltage used was 7V for all the display elements. The dielectric anisotropy $\Delta\epsilon_{LC}$, the refractive index anisotropy $\Delta n$, the electrode substrate gap d ($\mu$m), the dielectric constant $\epsilon_M$ (1 kHz) at 0.3V of the liquid crystal and solidified matrix composite material, the elastic constant K11 (x $10^{-12}$ N), K33 (x $10^{-12}$ N), the viscosity $\eta$ (cSt) of the liquid crystal, the contrast ratio CR on the screen when the same optical system as that in Example 1 was used to form a projection type display, and the hysteresis H were measured for respective liquid crystal display elements. Results are shown in Table 1.

TABLE 1

| Example | $\Delta\epsilon_{LC}$ | $\Delta n$ | d | $\epsilon_M$ | K11 | K33 | $\eta$ | CR | H | Evaluation |
|---|---|---|---|---|---|---|---|---|---|---|
| Comparative Example 1 | 9.9 | 0.17 | 16.0 | 8.2 | | | | 30 | 0.07 | X |
| Example 2 | 9.8 | 0.23 | 14.0 | 8.1 | | | | 130 | 0.08 | ⊙ |
| Example 3 | 11.6 | 0.24 | 13.5 | 8.7 | | | | 140 | 0.15 | ⊙ |
| Example 4 | 11.6 | 0.24 | 13.5 | 7.2 | | | | 140 | 0.25 | ○ |
| Example 5 | 10.5 | 0.21 | 14.0 | 8.2 | 17 | 15 | 34 | 180 | 0.06 | ⊙ |
| Comparative Example 2 | 13.8 | 0.24 | 13.5 | 9.1 | | | | 140 | 0.45 | X |
| Comparative Example 3 | 15.6 | 0.25 | 12.5 | 10.1 | 13 | 18 | 54 | 150 | 0.80 | X |
| Comparative Example 4 | 17.0 | 0.28 | 11.5 | 10.8 | | | | 150 | 1.00 | X |

The values of the hysteresis in Table 1 show relative values wherein the magnitude of the hysteresis in the voltage-transmittance characteristics of Comparative Example 4 is determined as 1. The average diameter of the liquid crystal in the liquid crystal and solidified matrix composite material was about 2.0 μm.

The clearing point Tc, the average particle diameter R of the liquid crystal used in Example 5 were respectively 80° C. and about 2.5 μm. The driving voltage to the liquid crystal display element of Example 5 was about 7V. The temperature condition for the liquid crystal display element was changed and the contrast ratio was measured on the screen. It was found that there was no substantial change in the contrast ratio at the element temperature of 10–60° C. (ambient temperature: 0–50° C.), and a value of about 120 or higher was obtained. Further, the voltage $V_{50}$ corresponding to a transmittance of 50% of the saturated transmittance did not show a substantial change to temperature, and it indicated 4.8V and 4.0V at 10° C. and 60° C. respectively.

When light entering into the liquid crystal display element was changed in the order of red, green and blue, the element showed a high contrast ratio as about 120 or higher to any of the color at 30° C. of element temperature (ambient temperature=20° C.).

The clearing point Tc of the liquid crystal used in Comparative Example 3 was 70° C., and the driving voltage to the liquid crystal display element was about 8V. The temperature condition for the liquid crystal display element was changed and the contrast ratio was measured on the screen. As a result, the contrast ratio was greatly changed at an element temperature of 10–60° C. (ambient temperature: 0–50°). Namely, the contrast ratio was about 170 at the element temperature of 10° C. and about 7 at 60° C. The contrast ratio showed about 100 or higher in a range of 10–35° C. The voltage $V_{50}$ indicating the transmittance of 50% of the saturated transmittance was greatly changed to temperature. The voltage was 6.3V and 2.6V at 10° C. and 60° C. respectively. Light entering into the liquid crystal display element was changed in the order of red, green and blue. The element showed a high contrast ratio as about 120 or higher to green and blue at 30° C. of element temperature (ambient temperature; 20° C.), however, it showed a contrast ratio of about 60 to red.

EXAMPLE 6

Liquid crystal display elements were prepared in the same manner as in Example 1 except for the electrode substrate gaps $d_R$, $d_G$ and $d_B$ and average liquid crystal particle diameters $R_R$, $R_G$ and $R_B$ for R, G and B. Namely, $d_R$=14.5 μm and R=2.1 μm for R, $d_G$=12.0 μm and $R_G$=1.9 μm for G, and $d_B$=10.5 μm and $R_B$=1.7 μm for B.

Three liquid crystal display elements thus prepared were disposed in the paths of light split by dichroic mirrors so that the split light were synthesized again for projection. The same projection light source and projection optical system as in Example 1 were used.

By the color projection type liquid crystal display apparatus, a projected picture image having a high contrast ratio and a clear half-tone without image-sticking could be obtained. Further, the projected picture image has good chromatic balance could be obtained without conducting complicated color adjustment at the side of a driving circuit.

EXAMPLE 7

Liquid crystal display elements were prepared in the same manner as in Example 1 except for electrode substrate gaps $d_R$, $d_G$ and $d_B$ for R, G and B. Namely, $d_R$=12.5 μm for R, $d_G$=11.0 μm for G and $d_B$=10.5 μm for B. The average diameter of liquid crystal particles was R=1.8 μm.

Three liquid crystal display elements thus prepared were arranged in the same manner as in Example 6 to thereby constitute a projection type liquid crystal display apparatus.

In the color projection type liquid crystal display apparatus, although the contrast ratio was slightly lower than that of Example 6, a projected picture image having a high contrast ratio and a clear half-tone could be obtained without image-sticking. Further, the projected picture image had good chromatic balance could be obtained without conducting complicated color adjustment at the side of a driving circuit.

EXAMPLE 8

Three liquid crystal display elements were prepared in the substantially same manner as in Example 3. A color projection type display apparatus was constituted by using a reflection type projection optical system in which the dimension of the electrode substrate gaps are all 11 μm: the liquid crystal display elements were made correspondence to the three colors of R, G and B: the picture element electrodes were made of aluminum: and a single dichroic prism was used in common for color—splitting and color-synthesizing.

When the display apparatus was driven by the application of the maximum application voltage of 8V, a display having high brightness and excellent half-tone could be obtained. The contrast ratio on the screen was about 100. The correction cone angle of the projection optical system was about 10°. Since there were some difference in the voltage dependence of the transmittance of the elements to respective kinds of color, driving voltage was changed for each color to obtain a balance of color. As a result, a colored dynamic image display could be obtained.

EXAMPLE 1'

Chrome was evaporated to a thickness of 60 nm on a glass substrate ("7059" Substrate by Corning), and the article was patterned to form gate electrodes thereon. Subsequently, a silicon oxynitride film and an amorphous silicon film were deposited by means of a plasma CVD device. Then, the amorphous silicon film was annealed using a laser and then patterned to make polysilicon. Phosphorus doped amorphous silicon and chrome were then deposited on the polysilicon using the plasma CVD device and an evaporating device and were then patterned in such a manner as to cover the polysilicon to make source electrodes and drain electrodes for the first layer. Further, ITO was evaporated, and then the article was patterned to form pixel electrodes. Subsequently, chrome and aluminum were successively evaporated on the source electrodes and drain electrodes for the first layer, and the article was patterned to make source electrodes and drain electrodes for the second layer. After then, a silicon oxynitride film was deposited to form a protective film by means of the plasma CVD device, thereby completing an active matrix substrate.

A counter electrode substrate formed as a substrate of the same glass material having an ITO electrode formed on the entire surface thereof and the active matrix substrate produced in such a manner as described above were disposed such that the electrodes thereof might be opposed to each other, and a spacer having a diameter of about 11.0 μm was sprayed into a spacing between the substrates whereafter the circumference of the substrates was sealed with seal material of the epoxy family except a location of a filling port to produce an empty cell having a substrate distance $d_G$ of about 11.0 μm.

Six parts of 2-ethyl hexyl acrylate, 18 parts of hydroxyethyl acrylate, 14 parts of acrylic oligomer ("M-1200" by Toa Gosei Kagaku), 0.4 parts of "Dalocure 1116" by MERCK as a light curing initiating agent, and 62 parts of liquid crystal "E-8" by BDH were dissolved uniformly.

The mixture was filled into the empty cell produced by the process described above by way of the filling port, and then the filling port was closed.

An ultraviolet ray was irradiated upon the cell for 60 seconds to cause the liquid crystal polymer composite to produce an active matrix liquid crystal display element for display of green.

The average particle diameter RG of the liquid crystal in the liquid crystal polymer composite of the liquid crystal display element thus produced was about 1.9 μm, the anisotropy of refractive index An of the liquid crystal was about 0.24, and the dielectric anisotropy Δε was about 15.6.

Another active matrix liquid crystal display element for display of red was produced in a similar manner. The average particle diameter $R_R$ of liquid crystal of the active matrix liquid crystal display element was about 2.4 μm, and the substrate distance $d_R$ was about 12.5 μm.

A further active matrix liquid crystal display element for display of blue was produced in a similar manner. The average particle diameter $R_B$ of liquid crystal of the active matrix liquid crystal display element was about 1.5 μm, and the substrate distance $d_B$ was about 9.0 μm.

Figure 5:
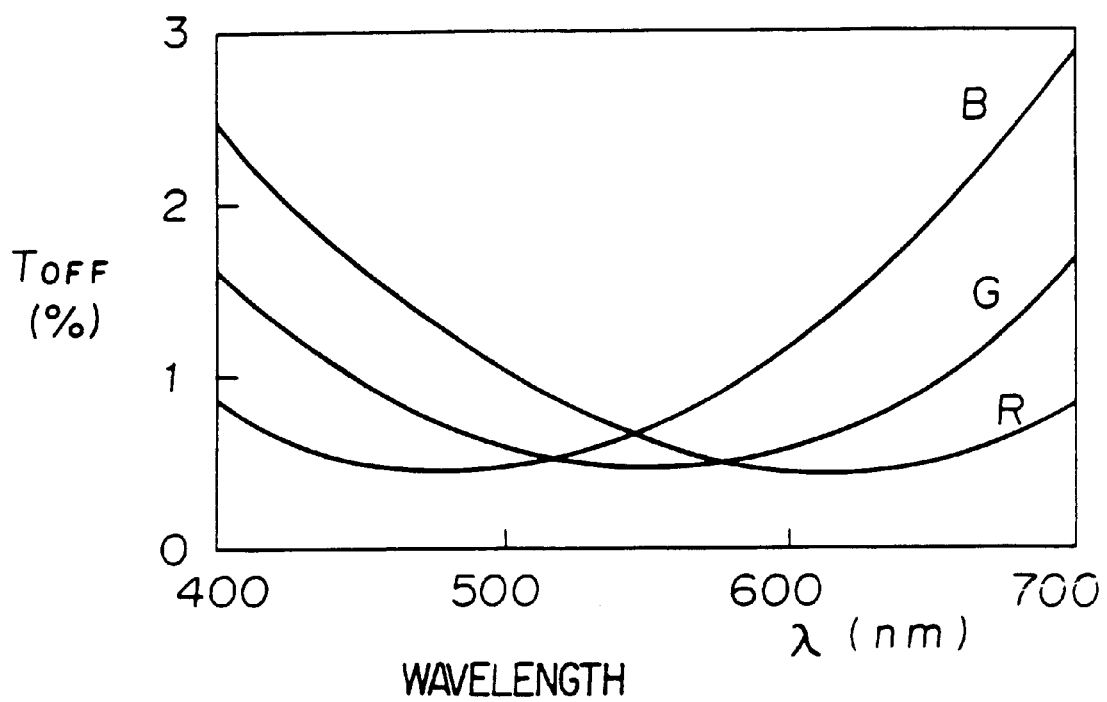
FIG. 5' is a graph showing wavelength characteristics of the transmittance of a liquid crystal display element produced in accordance with the present invention.

Wavelength characteristics in transmittance $T_{OFF}$ of the liquid crystal display elements when no electric field was applied are individually such as shown in FIG. 5'. As seen in FIG. 5', a high scattering performance, that is, a low $T_{OFF}$, is exhibited in or around a waveform range of 570 to 670 nm in the case of the liquid crystal display element for red (indicated by R in FIG. 5'), in or around another waveform range of 490 to 580 nm in the case of the liquid crystal display element for green (G), and in or around a further wavelength range of 420 to 520 nm in the case of the liquid crystal display element for blue (B).

A projection type display device having such a construction as shown in FIG. 3 was constructed using three such liquid crystal display elements, and a video signal was inputted to a drive circuit to drive the display device such that a voltage to be applied to the liquid crystal polymer composites of the liquid crystal display elements might be 8 volts in root mean square value so as to project a projection image on a projection screen.

As a result, a full-color picture image of animation display free from an after-image was obtained, and a bright display wherein a color balance was substantially attained at each gray scale and the contrast ratio on the projection screen was higher than 100 was obtained.

It is to be noted that the contrast ratio of an image projected on the projection screen was about 60 when no aperture member was used as a device for reducing diffused light.

COMPARATIVE EXAMPLE 1'

The liquid crystal display elements for green of Example 1' above were prepared and combined with three colored light sources of red, green and blue to construct a projection type display device similar to that of Example 1'.

A display obtained on the projection type display device was a generally reddish picture image, and this tendency was remarkable at a lower voltage level. Further, when no electric field was applied to the three liquid crystal display elements, the projection screen exhibited not a dark condition but a dark red condition. It is considered that this was caused by the fact that the threshold voltage characteristics of the liquid crystals are different for red, green and blue, and examination of applied voltage-transmittance characteristics for red, green and blue revealed that, at a middle voltage level, the transmittance was highest with red and lowest with blue at the same applied voltage.

COMPARATIVE EXAMPLE 2'

Three liquid crystal display elements were produced wherein the substrate distance $d_R$, $d_G$ and $d_B$ thereof were the same as those in Example 1' above but only the average particle diameters $R_R$, $R_G$ and $R_B$ of the liquid crystals were changed to about 3.6 μm for red, about 2.9 μm for green and about 2.3 μm for blue. The liquid crystal display elements were combined with three colored light sources of red, green and blue to construct a projection type display device similar to that of Example 1'.

A display obtained in the projection type display device was bright, but the contrast ratio thereof was a low value of about 10.

EXAMPLE 2'

A projection type display device having such a construction as shown in FIG. 4 was constructed using the same liquid crystal display elements as in Example 1' above. The projection type display device also presented a display which is good in color balance and high in brightness and also in contrast ratio similarly to that of Example 1'.

EXAMPLE 3'

An active matrix liquid crystal display element wherein d was about 11 μm, the average particle diameter R of liquid crystal was about 2.0 μm, the anisotropy of refractive index An of the liquid crystal was about 0.24 and the dielectric anisotropy Δε was about 15.6 was produced in a similar manner as in Example 1' above.

The element was driven using a conventional driving integrated circuit for a liquid crystal display element of the TN type such that the voltage to be applied to the liquid crystal polymer composite may be 7 volts in root mean square value. As a result, the rectilinear light transmittance was about 80% upon application of 7 volts and about 0.5% upon application of 0 volt, and a display wherein the contrast ratio was about 160 was obtained when the element was driven with 7 volts. Further, when the element was driven with a video signal, a black and white animation display was obtained which had a gray scale but was free from an after-image.

A projection light source and an optical system of projection were combined with the liquid crystal display element to make a projection type liquid crystal display device. When the liquid crystal display device was driven such that the voltage to be applied to the liquid crystal polymer composite might be 7 volts in root mean square value in a similar manner as described hereinabove, a bright display having a high contrast ratio was obtained in a projection screen.

The contrast ratio of an image projected on the projection screen was about 60 when no device for reducing diffused light was used. However, when a spot member was used as a device for reducing diffused light, the contrast ratio was about 120.

Further, when the liquid crystal display device was driven with a video signal, an animation display of a large screen greater than 50 inches was possible.

COMPARATIVE EXAMPLE 3'

Ordinary nematic liquid crystal was filled in place of the liquid crystal polymer composite of Example 3' above to produce an active matrix liquid crystal display element in the form of a liquid crystal display element of the TN type.

The projection light source and optical system of projection of Example 3' was combined with the liquid crystal display element to make a projection type liquid crystal display device, which was then driven in a similar manner as in Example 3'. As a result, only a display was obtained wherein the brightness on the projection screen was about one third that of Example 3' and the contrast ratio was low of about 20.

EXAMPLES 4' AND 5' AND COMPARATIVE EXAMPLES 4' TO 8'

Various active matrix liquid crystal display elements were produced in a substantially similar manner as in Example 1' above but varying the average particle diameter R of liquid crystal and the substrate distance d.

Transmittances $T_{7V}$ of the liquid crystal display elements with respect to white light upon application of a voltage of 7 volts, contrast ratios $CR_D$ of the liquid crystal display elements themselves depending upon their rectilinear light transmittances, and contrast ratios $CR_P$ upon projection to a projection screen when such a spot member as shown in FIG. 4 was used as a device for reducing diffused light, were measured.

Results are shown in Table 1' below.

TABLE 1'

| Example No. | R μm | d μm | $T_{7V}$ % | Contrast Ratio $CR_D$ | Contrast Ratio $CR_P$ |
|---|---|---|---|---|---|
| Comparative Example 4' | 1.0 | 11.0 | 25 | 70 | 50 |
| Comparative Example 5' | 1.5 | 11.0 | 45 | 90 | 60 |
| Example 3' | 2.0 | 11.0 | 80 | 160 | 120 |
| Comparative Example 6' | 3.5 | 11.0 | 82 | 15 | 10 |
| Comparative Example 7' | 2.0 | 5.0 | 83 | 10 | 7 |
| Comparative Example 8' | 2.0 | 20.0 | 15 | 50 | 30 |
| Example 4' | 1.5 | 8.0 | 82 | 140 | 100 |
| Example 5' | 2.5 | 13.0 | 78 | 100 | 70 |

EXAMPLE 6'

When the liquid crystal display element of Comparative Example 5' was driven with 10 volts, $T_{10V}$ was about 77% $CR_D$ was about 150, and $CR_P$ was about 110.

EXAMPLE 7'

An active matrix liquid crystal display element for display of green was produced in a similar manner as in Example 1'. The average particle diameter R of liquid crystal in a liquid crystal polymer composite of the liquid crystal display element for display of green was about 1.9 μm, the anisotropy of refractive index Δn of the liquid crystal was about 0.24, the dielectric anisotropy Δε was about 15.6 and the substrate distance $d_G$ was about 11.0 μm.

Further active matrix liquid crystal display elements for display of red (the average particle diameter R of liquid crystal was about 1.9 μm and the substrate distance $d_R$ was about 12.0 μm) and for display of blue (the average particle diameter R of liquid crystal was about 1.9 μm and the substrate distance $d_B$ was about 10.0 μm) were produced in a similar manner.

Voltage-transmittance characteristics of the liquid crystal display elements were measured for individual colors. The measurements revealed that the characteristic are substantially same with each other.

A projection type display device having such a construction as shown in FIG. 3 was constructed using the three liquid crystal display elements, and a video signal was inputted to a drive circuit to drive the projection type display device such that the voltage to be applied to the liquid crystal polymer composite might be 8 volts in root mean square value to project a projection image on a projection screen.

As a result, a full-color picture image of animation display free from an after-image was obtain and a bright display wherein a color balance was substantially attained at each gray scale and the contrast ratio on the projection screen was higher than 80 was obtained.

It is to be noted that the contrast ratio of an image projected on the projection screen was about 40 when no aperture member was used as a device for reducing diffused light.

COMPARATIVE EXAMPLE 9'

Three liquid crystal display elements for green of Example 7' above were prepared and combined with three colored light source of red, green and blue to construct a projection type display device similar to that of Example 7'.

A display obtained in the projection type display device was a generally reddish picture image, and this tendency was remarkable at a lower voltage level. Further, when no electric field was applied to the three liquid crystal display elements the projection screen exhibited not a dark condition but a dark red condition. It is considered that this was caused by the fact that the threshold voltage characteristics of the liquid crystals are different for red, green and blue, and examination of applied voltage-transmittance characteristics for red, green and blue revealed that, at a middle voltage level, the transmittance was highest with red and lowest with blue at the same applied voltage.

COMPARATIVE EXAMPLE 10'

Three liquid crystal display elements were produced wherein the substrate distances $d_R$, $d_G$ and $d_B$ thereof were the same as those in Example 1' above but the average particle diameters R of the liquid crystals were changed to 3.0 μm. The liquid crystal display elements were combined with three colored-light sources of red, green and blue to construct a projection type display device similar to that of Example 7'.

A display obtained on the projection type display device was bright, but the contrast ratio thereof was a low value of about 10.

EXAMPLE 8'

A projection type display device having such a construction as shown in FIG. 4 was constructed using the same liquid crystal display elements as in Example 7' above. The projection type display device also presented a display which is good in color balance and high in brightness and also in contrast similarly to that of Example 7'.

EXAMPLE 9'

Three color filters of red, green and blue were formed on the counter electrode substrate of Example 1' above, and a counter electrode of ITO was formed over the color filters. In this instance, the color filters were differentiated in thickness such that, when they were combined with an active matrix substrate, the electrode distance might be 12.0 μm at a location of a red pixel, 11.0 μm at a location of a green pixel and 10.0 μm at a location of a blue pixel. It is to be noted the average particle diameter R of the liquid crystals was 1.9 μm and substantially uniform.

A video signal was inputted to drive circuits of the liquid crystal display elements such that the voltage to be applied to the liquid crystal polymer composite might be 8 volts in root mean square value. As a result, a bright display which is good in color balance was obtained.

The liquid crystal display elements are combined with a white light source, an optical system of projection and an aperture member to construct a projection type display device, and a projection image was projected on a projection screen from the projection type display device. As a result, a display which is high in brightness and contrast ratio and good in color balance was obtained.

EXAMPLE 10'

Three active matrix liquid crystal display elements were prepared in the same manner as Example 1' except that a thin film transistors having inverse-stagger type amorphous silicon are used, light to the side of the substrate is interrupted by the gate electrodes and light to the side of the liquid crystal is interrupted by a light shielding layer through an insulating film.

A projection type display device was constructed using thus prepared liquid crystal elements, and a display which is the same as that of Example 1' was obtained. In the liquid crystal display elements of this Example, however, an additional step of forming the light shielding layer was necessary. Further, the display was adversely influence when there was a fault in the light shielding layer.

As apparent from the foregoing description, an active matrix liquid crystal display element is good in color balance of a display thereof, and driving thereof is facilitated because a driving wave form need not be corrected for each color on the driving circuit side.

In the liquid crystal display element of the present invention, since a liquid crystal and solidified matrix composite material which electrically controls a scattering state and a transparent state is used as a liquid crystal material and the liquid crystal and solidified matrix composite material is held between a pair of substrates such as an active matrix substrate and a counter electrode substrate, polarization plates are unnecessary, whereby the transmittance of light in a light-transparent state can be remarkably improved.

The liquid crystal display element of the present invention, in which a nematic liquid crystal having a positive dielectric anisotropy is used and the refractive index of a solidified matrix substantially agrees with the ordinary refractive index ($n_o$) of liquid crystal used, exhibits high scattering property under the condition that no electric field is applied and high transparent property under the condition that an electric field is applied. Accordingly, it has a high contrast ratio and a display of high brightness is possible even when a conventional driving IC for a TN type liquid crystal display element is used.

In accordance with the present invention, it is possible to obtain a gray scale display having a clear half-tone when gray scale driving is conducted, and to reduce an image-sticking phenomenon due to the hysteresis.

Accordingly, the liquid crystal display element of the present invention is effective to a projection type display, and a projection type display apparatus having no or little image-sticking, high brightness, and good contrast ratio can be obtained. Further, it is possible to reduce the size of a light source.

In the liquid crystal display element of the present invention, a change of scattering property due to temperature is small and a change of voltage transmittance characteristics due to temperature is small. Accordingly, gradation-driving can be stable and easy in a broad temperature range.

Further, since it is unnecessary to use the polarization plates, the wavelength dependency of the optical characteristics is small and there is little requirement for color correction for the light source.

Further, possible problems of orientation processing such as rubbing necessary for the TN type liquid crystal display element and destruction of the active element due to the orientation processing and static electricity generated from the processing can be avoided, and the yield of production of the liquid crystal display elements can be improved significantly.

Since the liquid crystal and solidified matrix composite material is formed in a form of film after curing, such problems of short-circuiting between the substrate by a pressure applied thereon and destruction of the active elements by displacement of spacers can be minimized.

Further, the liquid crystal and solidified matrix composite material is similar in specific resistance to that in the conventional TN mode, and great storage capacitor need not be provided for each picture elements as in the DS mode. Accordingly, designing of the active elements can be facilitated and the ratio of an effective picture element electrode area can be increased, and power consumption of the liquid crystal display element can be small.

Further, since the liquid crystal display element can be produced only by eliminating the orientation film forming step from a conventional process of production of the liquid crystal element of the TN mode, production of the element can be easy.

The liquid crystal display element which employs the liquid crystal and solidified matrix composite material has a feature that the response time is short, and a display of dynamic picture can be made easily. Further, since the electric-optical characteristics (voltage transmittance dependence) of the liquid crystal display element is looser than a conventional liquid crystal display element of the TN mode, it can be easily applied to display gray scale.

In addition, when the liquid crystal display element of the present invention is rendered to be in transparent state upon application of an electric field, light is scattered by a portion to which no electric field is applied and there is no leak of light upon projection of light even if a light shielding layer for interrupting light is not provided at the portion other than picture elements. Accordingly, there is no necessity of provision of a light shielding means between adjacent picture elements. Accordingly, where an active element made of polysilicon is used, a projection light source of a high brightness can be used without using a light shielding layer or with a thin light shielding layer to the active element, whereby a projection type liquid crystal display apparatus of a high brightness can be easily obtained. Further, no light shielding layer is necessary in this instance, and accordingly, the process of production can be simplified.

As apparent from the foregoing description, an active matrix liquid crystal display element is good in color balance of a display thereof, and driving thereof is facilitated because a driving wave form need not be corrected for each color on the driving circuit side.

In a projection type active matrix liquid crystal display device of the present invention, since a liquid crystal display element is used wherein a liquid crystal material to be held between an active matrix substrate and a counter electrode substrate is a liquid crystal polymer composite which can be electrically controlled between a scattering condition and a transmitting condition, no polarizing plate is required, and the transmittance of light upon transmission can be improved significantly and accordingly a bright projection picture image can be obtained.

The liquid crystal display element of the present invention has a high light scattering property when no electric field is applied thereto but has a high transmittance when an electric field is applied by way of an active element. Even if it is driven by means of a conventional driving integrated circuit for a liquid crystal display element of the TN type, it still presents a high contrast ratio and provides a display of a high brightness.

Further, according to the present invention, since characteristics of liquid crystal display elements are optimized for individual colors of colored light sources, a display having a good color balance can be obtained also at a gray scale.

Particularly, where both of the average particle diameters R of liquid crystal and the electrode distances d are optimized with the dominant wave length λ, a display can be obtained which is high in contrast ratio and good in color balance. Further, while the contrast ratio is deteriorated and the allowable range is decreased comparing with the case just described, it is also possible to optimize only the electrode distance d with the dominant wave length λ. In this instance, since the average particle diameters R of the liquid crystals may be equal to each other, there are advantages that the productivity is high, that a full color display can be made by means of a single liquid crystal display element where it is combined with color filters, and so forth.

Further, since no polarizer need be employed, also there is an advantage that the wavelength dependence of optical characteristics is low, and accordingly, color correction for a light source or the like is little required.

Moreover, since possible problems of destruction of active elements or the like upon an orientation processing such as rubbing necessary for a liquid crystal display element of the TN type or by static electricity generated inadvertently can be avoided, the yield in production of liquid crystal display elements can be improved significantly. Further, since the liquid crystal polymer composite presents the form of a film after curing thereof, such problems as short-circuiting between substrates by pressure thereupon and destruction of active elements by displacement of a spacer do not take place readily.

Further, the liquid crystal polymer composite is similar in specific resistance to that in the conventional TN mode, and a great storage capacitor need not be provided for each pixel element as in the DS mode.

Consequently, designing of active elements can be facilitated and the ratio of an effective pixel electrode area can be increased readily, and besides power consumption of liquid crystal display elements can be restricted to a low level.

Further, since liquid crystal display elements can be produced only by eliminating an orientation film forming step from a conventional process of production of liquid crystal display elements of the TN mode, production of them can be made readily.

Meanwhile, the liquid crystal display element which employs the liquid crystal polymer composite has a feature that the response time is short, and a display of an animation can be made readily. Further, since the electro-optical characteristics (voltage-transmittance dependence) of the liquid crystal display element is looser than a conventional liquid crystal display element of the TN mode, it can be readily applied to display gray scale.

In addition, since, in the liquid crystal display element of the present invention, light is scattered by a portion thereof to which no electric filed is applied, even if a light shielding layer for interrupting light is not provided at any portion other than pixels, there is no leak of light upon projection of light, and accordingly, there is no necessity of provision of light shielding means between adjacent pixels. Consequently, where an active element made of polysilicon is used as an active element, a projection light source of a high brightness can be used without provision of light shielding layers at active element portions of the liquid crystal display element. Accordingly, a projection type liquid crystal display device of a high brightness can be used readily. In addition, no light shielding layer need be provided in this instance, and accordingly, the process of production can be further simplified.

In the present invention, various applications are possible as far as the effect by the present invention is not injured.

What is claimed as new and desired to be secured by Letters: Patent of the United States is:

1. A liquid crystal display device comprising:
   a liquid crystal display element comprising:
   (i) a first substrate with a pixel electrode drive by an active element for said pixel electrode;
   (ii) a second substrate with a counter electrode; and
   (iii) a liquid crystal polymer composite, held between said first substrate and said second substrate comprised of a nematic liquid crystal dispersively contained in a polymer matrix having a refractive index which is substantially equal to the ordinary index (no) of said nematic liquid crystal used,
   wherein said nematic liquid crystal has an anisotropy of refractive index $0.18 \leq \Delta n$; and
   wherein the anisotropy of relative dielectric constant ($\Delta \epsilon_{LC}$) is $5 < \Delta \epsilon_{LC} < 13$.

2. The liquid crystal display device of claim 1, wherein said liquid crystal polymer composite comprises a polymer matrix having a large number of fine holes formed therein wherein said liquid crystal fills in the holes of said polymer matrix to form microcapsules.

3. The liquid crystal display device of claim 2, wherein said microcapsules, are completely independent of each other.

4. The liquid crystal display device of claim 2, wherein said microcapsules are connected partially with each other.

5. The liquid crystal display device of claim 2, wherein said nematic liquid crystal has an anisotropy of relative dielectric constant $(\Delta \epsilon_{LC}) \geq 11.6$.

6. The liquid crystal display device of claim 5, wherein said nematic liquid crystal has an anisotropy of relative dielectric constant ($\Delta \epsilon_{LC}$) of about 10.

7. The liquid crystal display device of claim 1, wherein the average particle diameter R($\mu$m) of the liquid crystal dispersively contained in said polymer matrix satisfies the relationship $$0.3 < R \cdot \Delta n < 0.7 \tag{1B}.$$

8. The liquid crystal display device of claim 1, wherein the distance d ($\mu$m) between said pixel electrode and said counter-electrode satisfies the relationship $$4R < d < 8R \tag{2B}.$$

9. The liquid crystal display device of claim 1, wherein the maximum root mean square of applied voltage for said liquid crystal polymer composite is $\geq 10$ volts,.

10. The liquid crystal display device of claim 1, wherein said nematic liquid crystal has an anisotropy of relative dielectric constant $(\Delta \epsilon_{LC}) \geq 11.6$.

11. The liquid crystal display device of claim 10, wherein said nematic liquid crystal has an anisotropy of relative dielectric constant ($\Delta \epsilon_{LC}$) of about 10.

12. A liquid crystal display element comprising:
   (i) a first substrate with a first electrode;
   (ii) a second substrate with a second electrode; and
   (iii) a liquid crystal polymer composite, held between said first substrate and said second substrate comprised of a nematic liquid crystal dispersively contained in a polymer matrix having a refractive index which is substantially equal to the ordinary index ($n_o$) of said nematic liquid crystal used,
   wherein said nematic liquid crystal has an anisotropy of refractive index $0.18 \leq \Delta n$;
   the average particle diameter R($\mu$m) of the liquid crystal dispersively contained in said polymer matrix satisfies the relationship $$0.3 < R \cdot \Delta n < 0.7 \tag{1B; and}$$

the distance d (μm) between said first electrode and said second electrode satisfies the relationship $$4R<d<8R \quad (2B).$$

13. The liquid crystal display element of claim 12, wherein said liquid crystal polymer composite comprises a polymer matrix having a large number of fine holes formed therein wherein said liquid crystal fills in the holes of said polymer matrix to form microcapsules.

14. The liquid crystal display device of claim 13, wherein said microcapsules, are completely independent of each other.

15. The liquid crystal display device of claim 13, wherein said microcapsules are connected partially with each other.

16. The liquid crystal display device of claim 12, wherein the maximum root mean square of applied voltage for said liquid crystal polymer composite is $\leq 10$ volts.

17. The liquid crystal display device of claim 12, wherein the maximum root mean square of applied voltage V(V) applied to the liquid crystal polymer composite satisfies the relationship $$0.5R \cdot V < d < R \cdot V \quad (3).$$

18. An active matrix type liquid crystal display element comprising:
   (i) a first substrate with a pixel electrode drive by an active element for said pixel electrode;
   (ii) a second substrate with a counter electrode; and
   (iii) a liquid crystal polymer composite, held between said first substrate and said second substrate comprised of a nematic liquid crystal dispersively contained in a polymer matrix having a refractive index which is substantially equal to the ordinary index ($n_o$) of said nematic liquid crystal used,
   wherein a specific resistance of said liquid crystal polymer composite is $>5 \times 10^9 \Omega \cdot cm$;
   the average particle diameter R(μm) of the liquid crystal dispersively contained in said polymer matrix is substantially uniform and 1.5 to 2.5 μm;
   the distance d (μm) between said first electrode and said second electrode is 8 to 13 μm; and
   the maximum root mean square of applied voltage for said liquid crystal polymer composite is $\leq 10$ volts.

19. The liquid crystal display element of claim 18, wherein said liquid crystal polymer composite comprises a polymer matrix having a large number of fine holes formed therein wherein said liquid crystal fills in the holes of said polymer matrix to form microcapsules which are completely independent of each other.

20. The liquid crystal display element of claim 18, wherein said liquid crystal polymer composite comprises a polymer matrix having a large number of fine holes formed therein wherein said liquid crystal fills in the holes of said polymer matrix to form microcapsules which are connected partially with each other.

21. The liquid crystal display element of claim 18, wherein said liquid crystal display element is provided with reflective means and used as a reflection type liquid crystal display element.

22. A projection liquid crystal display apparatus comprising a light source,
   an optical system of projection; and a liquid crystal display device comprising an active matrix liquid crystal element wherein a liquid crystal/polymer composite is held between an active matrix substrate on which an active element is provided for each pixel electrode and a counter electrode substrate on which a counter electrode is provided, said liquid crystal/polymer composite comprising a liquid crystal material having a positive dielectric constant and an anisotropy of refractive index Δn which is greater than or equal to 0.18, and having a volume fraction which is greater than or equal to 62% and less than 70%, the polymer matrix of the liquid crystal/polymer composite comprising polymerized units of acrylate and acrylic oligomer, and having pores formed therein; and wherein
   the specific resistance of said liquid crystal/polymer composite is higher than $5 \times 10^8$ Ωcm;
   the haze value of said liquid crystal/polymer composite is higher than 80% in a scattering condition and the transmittance is higher than 70%, and wherein the contrast ratio of said display is greater than 100.

23. The display apparatus according to claim 22 wherein the active element is a thin film transistor.

24. The display apparatus according to claim 22, wherein said display is a reflection display.

25. A composition comprising a liquid crystal and a photocurable acrylate monomer, said composition being useful for preparing a liquid crystal/polymer composite capable of exhibiting transparent and light scattering states, wherein Δn and Δε of said liquid crystal satisfy the following relationships:
   $\Delta n \geq 0.18$;
   $5 < \Delta \epsilon < 13$.

26. The composition according to claim 25, wherein $\Delta \epsilon < 11.6$.

27. The composition according to claim 25, wherein $\Delta n \geq 0.20$.

28. The composition according to claim 25, wherein $\Delta n < 0.25$.

29. The composition of claim 25, wherein said photocurable acrylate is a urethane acrylate oligomer.

30. The composition of claim 25, further comprising a photoinitiator.

31. The composition of claim 25, wherein $\Delta n^2/\eta > 0.0014$ wherein η(cSt) is the viscosity of said liquid crystal.

32. The composition according to claim 25, wherein the volume fraction of liquid crystal in said composition is greater than 45%.

33. A liquid crystal optical element comprising:
   a pair of substrates provides with electrodes, and
   a liquid crystal and solidified matrix composite material, disposed between the pair of substrates, said composite material being capable of exhibiting transparent and scattering states, wherein Δn and Δε of said liquid crystal satisfy the following relationships:
   $\Delta n \geq 0.18$;
   $5 < \Delta \epsilon < 13$.

34. A liquid crystal optical element according to claim 33, further comprising multiplex driving means for driving for said liquid crystal and solidified matrix composite.

35. A liquid crystal optical element according to claim 33, further comprising a static driving means for driving for said liquid crystal and solifified matrix composite.

36. A laser shutter device comprising a liquid crystal optical element according to claim 33.

37. A laser shutter device comprising a liquid crystal optical element according to claim 33.

38. A laser shutter device comprising a liquid crystal optical element according to claim 35.

* * * * *